United States Patent
Lin et al.

(10) Patent No.: US 10,664,092 B2
(45) Date of Patent: May 26, 2020

(54) PORTABLE ELECTRONIC DEVICE, OPERATING METHOD FOR THE SAME, AND NON-TRANSITORY COMPUTER READABLE RECORDING MEDIUM

(71) Applicant: HTC Corporation, Taoyuan (TW)

(72) Inventors: Chia-Yao Lin, Taoyuan (TW);
Yen-Hung Lin, Taoyuan (TW);
Shih-Lung Lin, Taoyuan (TW);
Chia-Chu Ho, Taoyuan (TW);
Hsuan-Yi Lee, Taoyuan (TW);
Kuan-Wei Li, Taoyuan (TW);
Jian-Shuen Chen, Taoyuan (TW);
Yu-Hung Chen, Taoyuan (TW);
Chun-Hung Hsieh, Taoyuan (TW);
Pin-Yu Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/699,155

(22) Filed: Sep. 8, 2017

(65) Prior Publication Data
US 2018/0074645 A1 Mar. 15, 2018

Related U.S. Application Data

(63) Continuation-in-part of application No. 15/594,851, filed on May 15, 2017.
(Continued)

(51) Int. Cl.
*G06F 3/041* (2006.01)
*G06F 3/01* (2006.01)
(Continued)

(52) U.S. Cl.
CPC ............ *G06F 3/0416* (2013.01); *G06F 1/169* (2013.01); *G06F 1/1613* (2013.01);
(Continued)

(58) Field of Classification Search
CPC combination set(s) only.
See application file for complete search history.

(56) References Cited

U.S. PATENT DOCUMENTS

| | | |
|---|---|---|
| 2003/0025678 A1 | 2/2003 | Lee et al. |
| 2006/0197750 A1 | 9/2006 | Kerr et al. |

(Continued)

FOREIGN PATENT DOCUMENTS

| | | |
|---|---|---|
| CN | 102713305 A | 10/2012 |
| CN | 102801835 A | 11/2012 |

(Continued)

OTHER PUBLICATIONS

Extended European Search Report, dated Dec. 8, 2017, for European Application No. 17190150.7.
(Continued)

*Primary Examiner* — Robin J Mishler
(74) *Attorney, Agent, or Firm* — Birch, Stewart, Kolasch & Birch, LLP

(57) ABSTRACT

A portable electronic device, an operating method for the same, and a non-transitory computer readable recording medium are provided. The portable electronic device includes a body, a touch display screen and an edge sensor. The touch display screen is disposed on the body. The edge sensor is disposed adjacent to an edge of the body. The operating method includes the following step. When an event is generated according to a first action sensed by the edge sensor, a touch function of a region of the touch display screen or the whole touch display screen is disabled.

20 Claims, 23 Drawing Sheets

Related U.S. Application Data

(60) Provisional application No. 62/501,784, filed on May 5, 2017, provisional application No. 62/385,924, filed on Sep. 9, 2016.

(51) Int. Cl.
  *G06F 3/0488* (2013.01)
  *G06F 1/16* (2006.01)

(52) U.S. Cl.
  CPC .......... *G06F 1/1626* (2013.01); *G06F 1/1694* (2013.01); *G06F 3/017* (2013.01); *G06F 3/0414* (2013.01); *G06F 3/04886* (2013.01); *G06F 2200/1636* (2013.01); *G06F 2200/1637* (2013.01); *G06F 2203/0339* (2013.01)

(56) References Cited

U.S. PATENT DOCUMENTS

| | | | | |
|---|---|---|---|---|
| 2010/0079395 | A1* | 4/2010 | Kim | G06F 1/1626 345/173 |
| 2011/0069024 | A1* | 3/2011 | Kim | G06F 3/01 345/173 |
| 2012/0105358 | A1 | 5/2012 | Momeyer et al. | |
| 2013/0176264 | A1 | 7/2013 | Alameh et al. | |
| 2013/0285956 | A1* | 10/2013 | Kamii | G06F 3/0416 345/173 |
| 2013/0300668 | A1* | 11/2013 | Churikov | G06F 3/041 345/168 |
| 2014/0317722 | A1* | 10/2014 | Tartz | G06F 3/011 726/19 |
| 2014/0340338 | A1* | 11/2014 | Kim | G06F 3/0488 345/173 |
| 2015/0022360 | A1 | 1/2015 | Chen et al. | |
| 2016/0070338 | A1* | 3/2016 | Kim | G06F 3/0488 345/173 |
| 2016/0110093 | A1* | 4/2016 | S | G06F 3/04883 715/863 |
| 2016/0253039 | A1 | 9/2016 | Heo et al. | |

FOREIGN PATENT DOCUMENTS

| | | |
|---|---|---|
| CN | 104160355 A | 11/2014 |
| EP | 2804088 A2 | 11/2014 |
| TW | 583877 B | 4/2004 |
| TW | 200941312 A | 10/2009 |
| TW | 201229876 A1 | 7/2012 |
| TW | 201432557 A | 8/2014 |
| TW | 201504847 A | 2/2015 |
| TW | 201505000 A | 2/2015 |
| TW | 201508762 A | 2/2015 |
| TW | 201606526 A | 2/2016 |

OTHER PUBLICATIONS

European Office Action dated Jul. 16, 2019, for European Application No. 18187190.6.
Taiwanese Office Action and Search Report for Taiwanese Application No. 107130168, dated Feb. 4, 2020.

\* cited by examiner

PORTABLE ELECTRONIC DEVICE, OPERATING METHOD FOR THE SAME, AND NON-TRANSITORY COMPUTER READABLE RECORDING MEDIUM

This application is a continuation-in-part application of co-pending application Ser. No. 15/594,851, filed on May 15, 2017, which claims the benefit of U.S. provisional application Ser. No. 62/385,924, filed Sep. 9, 2016 and U.S. provisional application Ser. No. 62/501,784, filed May 5, 2017, the subject matters of which are incorporated herein by reference.

BACKGROUND

Technical Field

The disclosure relates to a portable electronic device, an operating method for the same, and a non-transitory computer readable recording medium, and more particularly to a portable electronic device comprising an edge sensor, an operating method for the same, and a non-transitory computer readable recording medium.

Description of the Related Art

Currently, a conventional portable electronic device such as cell phone, etc., has a touch display screen on a front surface of which and provided for displaying an image or sensing a touch action from a user. The portable electronic device can perform a functional operating according to the sensed touch action.

SUMMARY

The present disclosure provides a portable electronic device, an operating method for the portable electronic device, and a non-transitory computer readable recording medium.

According to a concept of the present disclosure, an operating method for a portable electronic device is provided. The portable electronic device comprises a body, a touch display screen and an edge sensor. The touch display screen is disposed on the body. The edge sensor is disposed adjacent to an edge of the body. The operating method includes the following step. When an event is generated according to a first action sensed by the edge sensor, a touch function of a region of the touch display screen or the whole touch display screen is disabled.

According to another concept of the present disclosure, a non-transitory computer readable recording medium for storing one or more programs is provided. The one or more programs causing a processor to perform the above operating method after the one or more programs are loaded on a computer and are executed.

According to yet another concept of the present disclosure, a portable electronic device is provided. The portable electronic device comprises a body, a processor, a touch display screen and an edge sensor. The touch display screen is disposed on the body. The edge sensor is electrically coupled to the process. The edge sensor is disposed adjacent to an edge of the body. When an event is generated according to a first action sensed by the edge sensor, a touch function of a region of the touch display screen or the whole touch display screen is disabled by the processor.

DETAILED DESCRIPTION

The following embodiments disclosed in the specification may be individual embodiments, or may be combined to form other embodiments according to actual demands.

Figure 1:
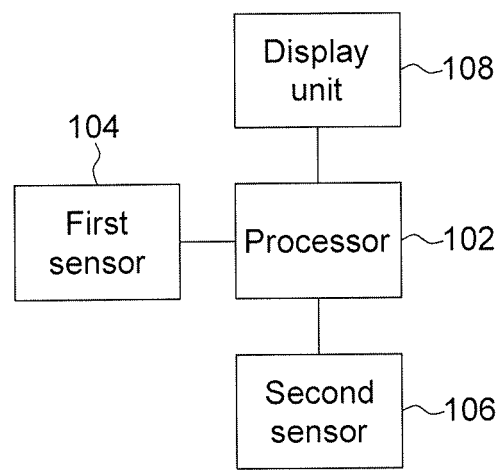
FIG. 1 shows the block diagram of a portable electronic device according to an embodiment of the invention.
Figure 2:
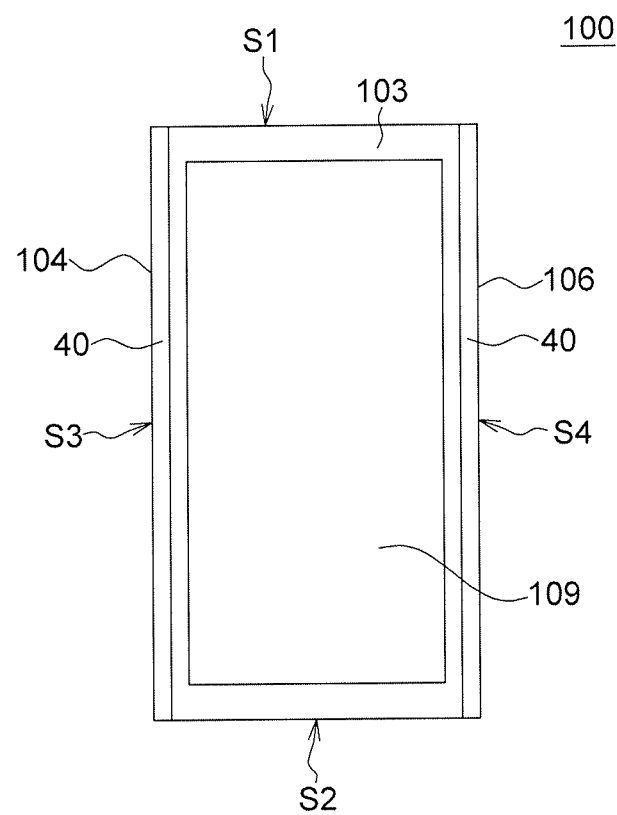
FIG. 2 shows a schematic diagram of the portable electronic device.

FIG. 1 shows the block diagram of a portable electronic device 100 according to an embodiment of the invention. FIG. 2 shows a schematic diagram of the portable electronic device 100. The portable electronic device 100 includes a body 103, processor 102, a first sensor 104, a second sensor 106, and a display unit 108. The processor 102 electrically coupled to the first sensor 104, the second sensor 106, and the display unit 108. The first sensor 104 or the second sensor 106 comprises an edge sensor 40 disposed adjacent to an edge of the body 103. In one embodiment, each of the first sensor 104 and the second sensor 106 comprises the edge sensor 40 as shown in FIG. 1. The display unit 108 comprises a touch display screen 109 disposed on the body 103. For example, the portable electronic device 100 may be a smart phone or a tablet. The portable electronic device 100 includes a first side S1, a second side S2, a third side S3, and a fourth side S4. The first side S1 and the second side S2 are short sides of the portable electronic device 100, and the third side S3 and the fourth side S4 are long sides of the portable electronic device 100. The first sensor 104 and the second sensor 106 are, for example, pressure sensors, resistive sensors, optical sensors, or ultrasonic sensors. The edge sensor 40 may be implemented by at least one of pressure sensor and a touch sensor or other type sensors. Based on the actual needs of the present invention, the first sensor 104 or the second sensor 106 may be disposed on at least one short side of the electronic apparatus, it is not limited thereto.

The processor 102 may include central processing units (CPUs) of the portable electronic device 100 and, thus, control the overall operation of portable electronic device 100. In certain embodiments, the processor 102 accomplishes this by executing software or firmware stored in the memory (not shown). The processor 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The touch display screen 109 may include a liquid-crystal display (LCD), a plasma display, a vacuum fluorescent display, a light-emitting diode (LED) display, a field emission display, and/or other suitable types of display configured to display a user interface.

The first sensor 104 and the second sensor 106 are disposed on the third side S3 and fourth side S4 of the portable electronic device 100. The first sensor 104 and the second sensor 106 each includes a plurality of sensing components which are arranged in a line. When a user activates the first sensor 104 or/and the second sensor 106 of the portable electronic device 100 by touching, pressing, sliding, flipping, or squeezing at least one long sides of the portable electronic device 100, these sensing components output corresponding signals. The processor 102 determines the force applied to the sensing components according to the signals outputted from the sensing components of the first sensor 104 or/and the second sensor 106 when the user activates the first sensor 104 or/and the second sensor 106 of the portable electronic device 100. The processor 102 determines the activated positions on the long side of the portable electronic device 100 according to the positions of the sensing components which are activated by the user. The user actions on the portable electronic device 100 can be determined by the processor 102 according to the force applied and the positions activated on the first sensor 104 or/and the second sensor 106. The user actions may include squeezing the portable electronic device 100 (e.g., press the first sensor 104 and the second sensor 106 at the same time), sliding on the long side of the portable electronic device 100, pressing on the long side of the portable electronic device 100, and flipping the edge on the long side of the portable electronic device 100.

Referring to Tables 1-1, 1-2 and 1-3, the corresponding operations of the portable electronic device 100 are performed according to the user actions and the status of portable electronic device 100.

TABLE 1-1

| | Status | | | |
|---|---|---|---|---|
| User action | Screen off (A) | Screen on (Global) (B) | Camera (C) | Video (D) |
| Flip the edge (1) | Edge sense panel | Edge sense panel | Edge sense panel | Edge sense panel |
| Squeeze (2) | None | None | Take photo/ video | Pause/ play |
| Long squeeze (3) | Voice record/ note | Voice record/ note | Voice record/ note | Voice record/ note |
| Double squeeze (4) | Launch camera | Launch camera | None | Launch camera |
| Slide (5) | None | Scroller | Brightness and Zoom | Brightness and progress bar |
| Slide both sides (6) | Screen capture | Screen capture | Screen capture | Screen capture |
| Press volume position (7) | Volume | Volume | Volume | Volume |
| Hold and quick slide (8) | Launch flashlight | Launch flashlight | Launch flashlight | Launch flashlight |
| Press L/R side in landscape (9) | None | None | None | None |

TABLE 1-2

| User action | Music (E) | Gaming (F) | Incall (G) | Alarm/alert (H) |
|---|---|---|---|---|
| Flip the edge (1) | Edge sense panel | Edge sense panel | Edge sense panel | Edge sense panel |
| Squeeze (2) | Pause/play | Pause/play | None | Snooze |
| Long squeeze (3) | Voice record/note | Voice record/note | End call | Dismiss |
| Double squeeze (4) | Launch camera | Launch camera | Launch camera | Launch camera |
| Slide (5) | Brightness and progress bar | Dismiss notification and DND | None | None |
| Slide both sides (6) | Screen capture | Screen capture | Screen capture | Screen capture |
| Press volume position (7) | Volume | Volume | Volume | Volume |
| Hold and quick slide (8) | Launch flashlight | Launch flashlight | Launch flashlight | Launch flashlight |
| Press L/R side in landscape (9) | None | Screen record widget | None | None |

TABLE 1-3

| User action | Incoming call (I) | Instant Message (IM)/Message with input method editor (IME) (J) | IM/Message without IME (K) | Web/photo (L) |
|---|---|---|---|---|
| Flip the edge (1) | Edge sense panel | Edge sense panel | Edge sense panel | Edge sense panel |
| Squeeze (2) | Answer | None | None | None |
| Long squeeze (3) | Decline | Voice input | Record and send voice message | Voice record/note |
| Double squeeze (4) | Launch camera | Launch camera | Launch camera | Launch camera |
| Slide (5) | None | None | None | Scroller |
| Slide both sides (6) | Screen capture | Screen capture | Screen capture | Screen capture |
| Press volume position (7) | Volume | Volume | Volume | Volume |
| Hold and quick slide (8) | Launch flashlight | Launch flashlight | Launch flashlight | Launch flashlight |
| Press L/R side in landscape (9) | None | None | None | None |

Figure 3:
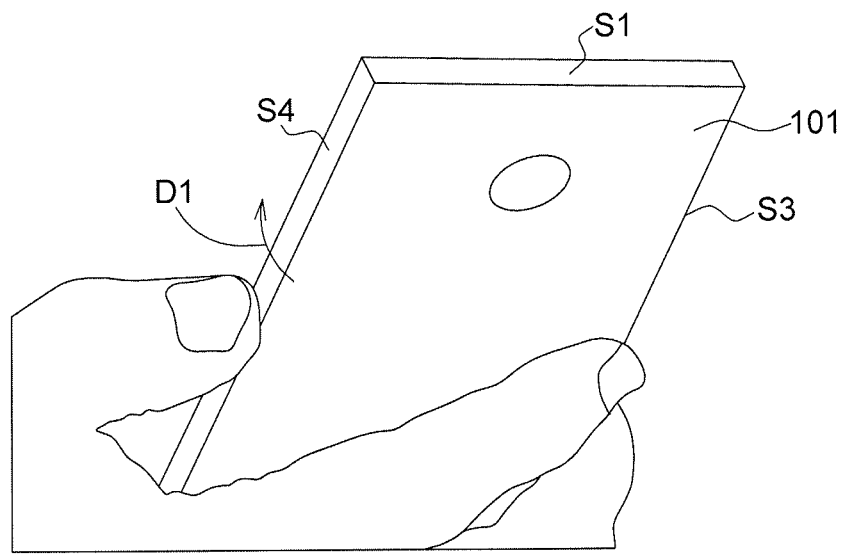
FIG. 3 shows a schematic diagram of the portable electronic device when the user flips the edge.
Figures 4A, 4B:
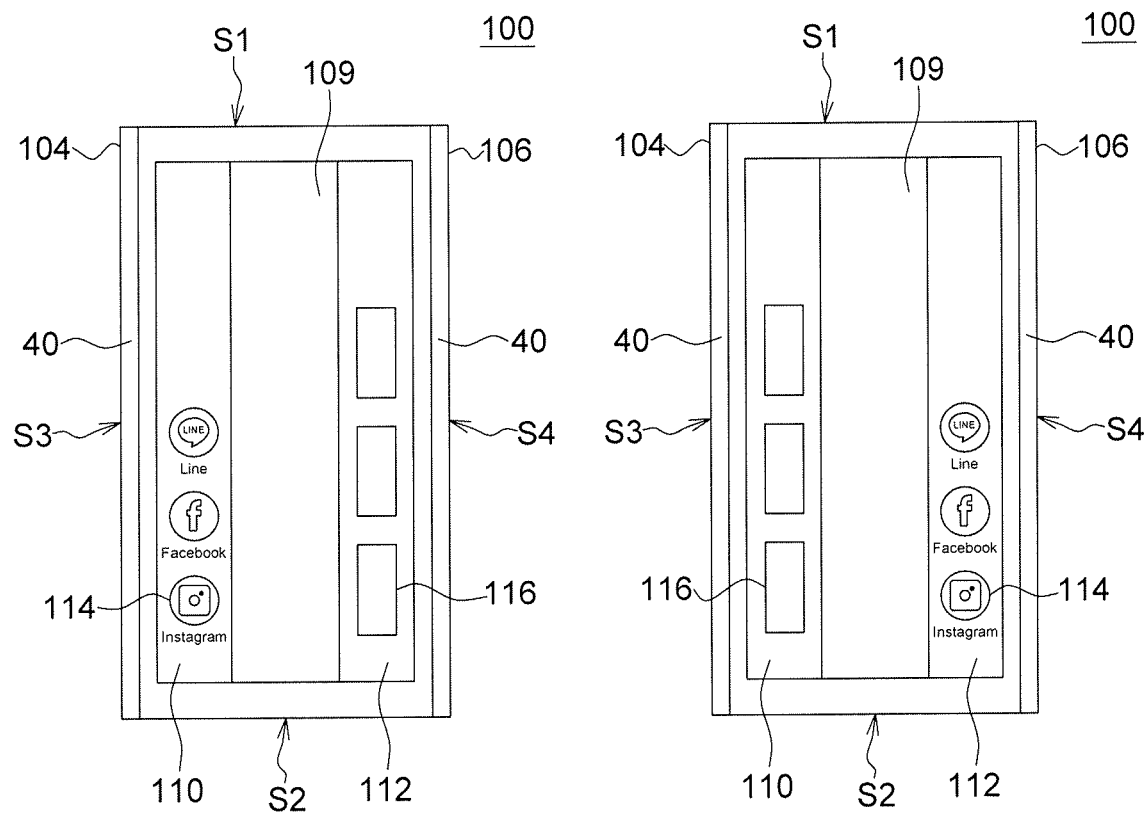
FIG. 4A shows a schematic diagram of the edge sense panel according to an embodiment of the invention.
FIG. 4B shows a schematic diagram of the edge sense panel according to another embodiment of the invention.

The corresponding operations are performed when the user flips the edge (user action 1) in different statuses of the portable electronic device 100. For example, when the screen of the portable electronic device 100 is turned on/off (status B/A), a camera of the portable electronic device 100 is launched (status C), the user watches the video (status D), listens to the music (status E), plays the games (status F) on the portable electronic device 100, the user is in a call (status G), an alarm/alert rings (status H), the user has an incoming call (status I), the user writes the Instant Message (IM)/message with input method editor (IME) (status J), the user writes the IM/message without IME (status K), or the user browses the web/photo (status L), the user flips the edge to trigger the function of showing the edge sense panel on the touch display screen 109. Referring to FIG. 3, FIG. 3 shows a schematic diagram of the portable electronic device 100 when the user flips the edge. The user action "flip the edge" represents that when the user holds the portable electronic device 100, the user uses a finger (for example, a thumb) to touch one of the long sides and moves the finger along a direction D1 from the rear cover 101 to the screen. The user action "flip the edge" may trigger at least one of the sensing components of the first sensor 104 or the second sensor 106 to output a corresponding sensing signal, and trigger the edge of the touch display screen 109 to output a corresponding touch signal. Therefore, within a specific time period, the processor 102 may receive the sensing signal and the touch signal, and accordingly determine the user action as "flip the edge" so as to perform a predefined function. Referring to FIG. 4A and FIG. 4B, a schematic diagram of the edge sense panel is shown. The edge sense panel includes a first displaying area 110 and a second displaying area 112. The first displaying area 110 and the second displaying area 112 are displayed on the touch display screen 109 and near the long sides S3 and S4. The first displaying area 110 and the second displaying area 112 display the shortcut icon 114 and information 116, such that the user can touch the shortcut icon 114 and information 116 easily. The shortcut icon 114 corresponds to application, for example, "Instagram", "Facebook" or "Line". When the user touches on the shortcut icon 114, the corresponding application launches. The information 116 can include but not limit to images, weather or news. In one embodiment, when the user holds the portable electronic device 100 by the left hand and uses the left thumb to flip the edge on the third side S3, the touch display screen 109 displays the edge sense panel in which the shortcut icons 114 are displayed in the first displaying area 110 and the information 116 is displayed in the second displaying area 112 (as shown in FIG. 4A). When the user holds the portable electronic device 100 by the right hand and uses the right thumb to flip the edge on the fourth side S4, the touch display screen 109 displays the edge sense panel in which the information 116 is displayed in the first displaying area 110 and the shortcut icons 114 are displayed in the second displaying area 112 (as shown in FIG. 4B). In one embodiment, an indicator is displayed on one of the shortcut icons 114 or any information 116. The user can move the indicator by sliding and pressing on the long side of the portable electric device 100 so as to select and execute one of the shortcut icons 114 or display one information 116.

The portable electric device 100 may detect which of the right hand and the left hand is holding the portable electric device 100 according to at least one finger position and a palm position sensed by the first sensor 104 and the second sensor 106. Specifically, when the sensor senses a dotted touch point (with a smaller area), the processor 102 determines that the dotted touch point is a finger touch, and the position of the dotted touch point is the finger position. When the sensor senses a sheeted touch point (with a larger area), the processor 102 determines that the sheeted touch point is a palm touch, and the position of the sheeted touch point is the palm position. Therefore, the processor 102 may determine the dotted touch point above the sheeted touch point as a thumb portion according to the palm position.

Figure 29:
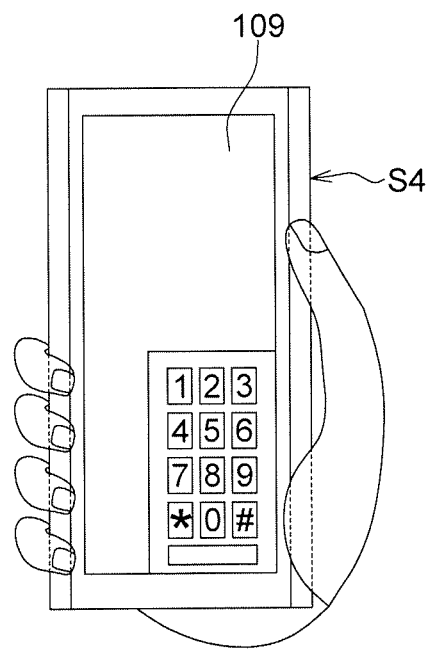
FIG. 29 shows a schematic diagram when a right hand holds a portable electronic device, and the portable electronic device shows a keyboard image adjacent to a right thumb.
Figure 30:
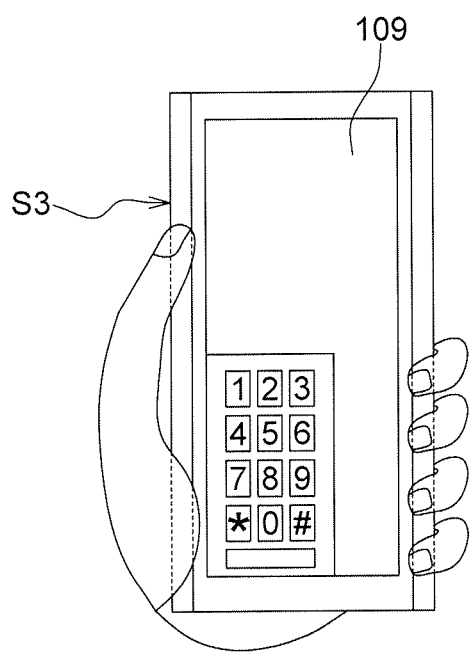
FIG. 30 shows a schematic diagram when a left hand holds a portable electronic device, and the portable electronic device shows a keyboard image adjacent to a left thumb.

The processor 102 may determine a display position of a keyboard image on the touch display screen 109 according to a gesture for holding the portable electric device 100 made by a user. In this way, it will be convenient for user to operate the device. For example, when the user uses the right hand to hold the portable electric device 100 (with the finger position on the third side S3 and the palm position on the fourth side S4), the touch display screen 109 displays the keyboard image in a region adjacent to the fourth side S4, as shown in FIG. 29, to be closer to the right thumb of the user. On the contrary, when the user uses the left hand to hold the portable electric device 100 (with the finger position on the fourth side S4 and the palm position on the third side S3), the touch display screen 109 displays the keyboard image in a region adjacent to the third side S3, as shown in FIG. 30, to be closer to the left thumb of the user. Therefore, the user could tap the keyboard with the thumb easily and precisely.

Figure 5:
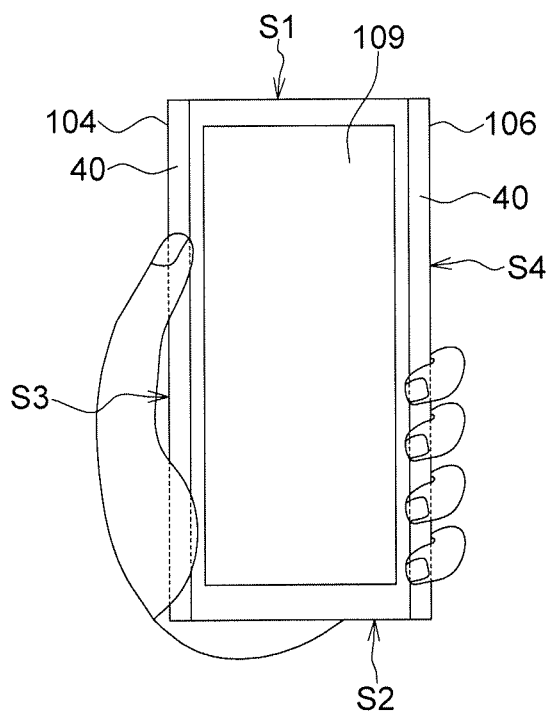
FIG. 5 shows a schematic diagram of the portable electronic device when the user squeezes the portable electronic device.

The corresponding operations are performed when the user squeezes the portable electronic device 100 (user action 2) in different statuses of the portable electronic device 100. For example, when a camera of the portable electronic device 100 is launched (status C), the user squeezes the portable electronic device 100 to take a photo or record a video. When the user watches video (status D), listens to music (status E), or plays games on the portable electronic device 100 (status F), the user squeezes the portable electronic device 100 to pause/play the video, the music or the games. When an alarm/alert rings (status H), the user squeezes the portable electronic device 100 to snooze the alarm/alert. When the user has an incoming call (status I), the user squeezes the portable electronic device 100 to answer the incoming call. Referring to FIG. 5, FIG. 5 shows a schematic diagram of the portable electronic device 100 when the user squeezes the portable electronic device 100. The user action "squeeze" represents that when the user holds the portable electronic device 100, the user presses both opposing long sides of the portable electronic device 100 firmly with fingers or hands. The user action is determined by the processor 102 as "squeeze" when the signal level of the signals outputted from the sensing components of the first sensor 104 and the second sensor 106 simultaneously exceed a force threshold.

The corresponding operations are performed when the user long squeezes the portable electronic device 100 (user action 3) in different statuses of the portable electronic device 100. For example, when a screen of the portable electronic device 100 is turned on/off (status B/A), a camera of the portable electronic device 100 is launched (status C), the user watches the video (status D), listens to the music (status E), plays the games on the portable electronic device 100 (status F), or the user browses the web/photo (status L), the user long squeezes the portable electronic device 100 to take notes by voice or typing. When the user is in a call (incall) (status G), the user long squeezes the portable electronic device 100 to end the call. When an alarm/alert rings (status H), the user long squeezes the portable electronic device 100 to dismiss the alarm/alert. When the user has an incoming call (status I), the user long squeezes the portable electronic device 100 to decline the incoming call. When the user writes the IM/message with IME (status K), the user long squeezes the portable electronic device 100 to type with the voice (voice input). When the user writes the IM/message without IME (status L), the user long squeezes the portable electronic device 100 to record and send the voice message. The user action "long squeeze" represents that the user continuously squeezes the first sensor 104 and the second sensor 106 of the portable electronic device 100 for a certain time longer than a time threshold. For example, the user action "long squeeze" is determined by the processor 102 when the time in which the user squeezes the portable electronic device 100 continuously is more than 3 seconds.

The corresponding operations are performed when the user double squeezes the portable electronic device 100 (user action 4) in different statuses of the portable electronic device 100. For example, when the screen of the portable electronic device 100 is turned on/off (status B/A), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user double squeezes the portable electronic device 100 to launch the camera. The user action "double squeeze" represents that the user squeezes the first sensor 104 and the second sensor 106 of the portable electronic device 100 two times continuously within a certain time interval. For example, the user action "double squeeze" is determined by the processor 102 when the user squeezes the portable electronic device 100 two times within two seconds. In one embodiment, the corresponding operation for the user action "double squeeze" is customizable. That is, the user can reset the corresponding operation. For example, the corresponding operation "launch camera" is reset to "launch the favorite apps".

Figure 6:
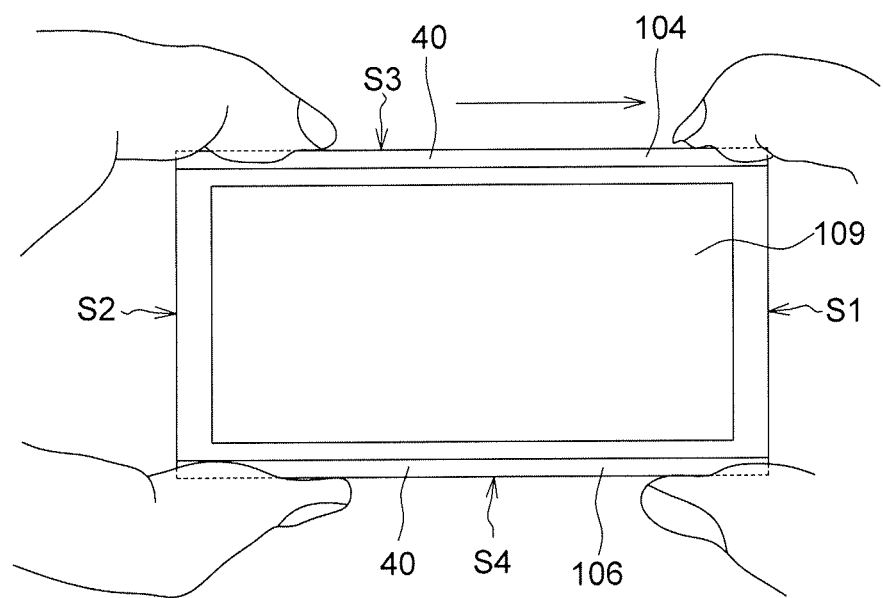
FIG. 6 shows a schematic diagram of the portable electronic device when the user finger slides on one of the two long sides of the portable electronic device.

The corresponding operations are performed when a finger of the user slides on one of the two long sides of the portable electronic device 100 (user action 5) in different statuses of the portable electronic device 100. The sensing components in the first sensor 104 or the second sensor 106 continuously and sequentially output the sensing signals within a specific time period corresponding to the slide action made by the user, and the processor 102 determines the user action as "slide" according to the sensing signals so as to perform a predefined function. For example, when the screen of the portable electronic device 100 is turned on (status B), or the user browses the web/photo (status L), the user slides on the side of the portable electronic device 100 to scroll the page/content displayed on the touch display screen 109. When a camera of the portable electronic device 100 is launched (status C), the user finger slides on the up side (the third side S3) of the portable electronic device 100 in landscape mode to adjust the brightness or slides on the bottom side (the fourth side S4) of the portable electronic device 100 in landscape mode to zoom the content displayed on the touch display screen 109. When the user watches the video (status D), the user finger slides on the up side (the third side S3) of the portable electronic device 100 in landscape mode to adjust the brightness or slides on the bottom side (the fourth side S4) of the portable electronic device 100 in landscape mode to adjust the progress bar. When the user listens to the music (status E), the user finger slides on one of the third side S3 and the fourth side S4 to adjust the progress bar. When the user plays the game (status F), the user finger slides on the up side (the third side S3) of the portable electronic device 100 in landscape mode to dismiss the notification and turn on do not disturb (DND). Referring to FIG. 6, FIG. 6 shows a schematic diagram of the portable electronic device 100 when the user finger slides on one of the two long sides of the portable electronic device 100. The user action "slide" represents that when the user holds the portable electronic device 100, the users uses a finger to touch one of the long sides and moves the finger along the touched long side.

Figure 7:
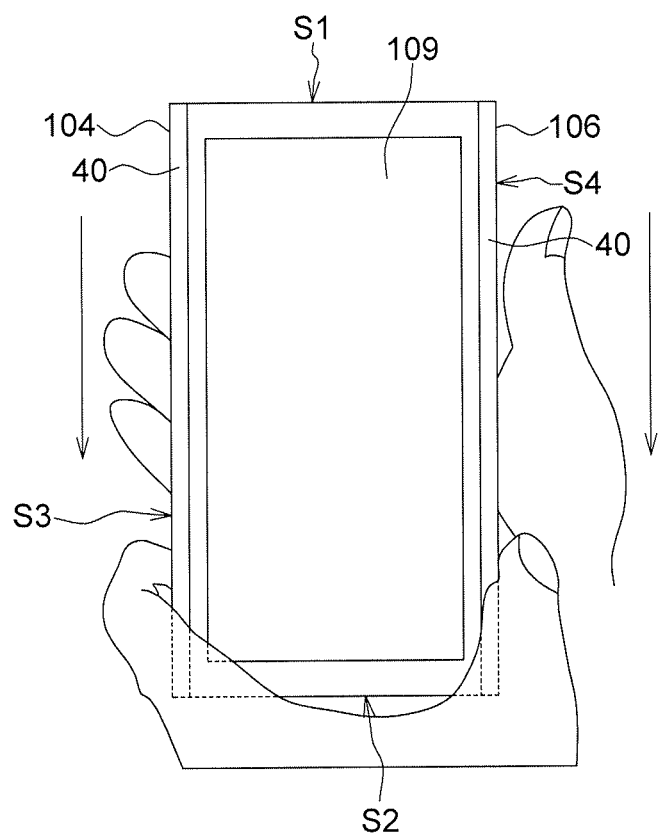
FIG. 7 shows a schematic diagram of the portable electronic device when the user finger slides on both long sides of the portable electronic device.

The corresponding operations are performed when the user finger slides on both long sides of the portable electronic device 100 (user action 6) in different statuses of the portable electronic device 100. The sensing components in the first sensor 104 and the second sensor 106 continuously and sequentially output the sensing signals within a specific time period corresponding to the slide action made by the user, and the processor 102 determines the user action according to the sensing signals. For example, when the screen of the portable electronic device 100 is turned on/off (status B/A), a camera of the portable electronic device 100 is launched (status C), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user finger slides on the both long sides of the portable electronic device 100 to capture the page/content displayed on the touch display screen 109 (screen capture). Referring to FIG. 7, FIG. 7 shows a schematic diagram of the portable electronic device 100 when the user finger slides on both long sides of the portable electronic device 100. The user action "slide both sides" represents that when the user holds the portable electronic device 100, the user uses at least two fingers to touch both long sides and moves the at least two fingers along the both long sides simultaneously.

The corresponding operations are performed when the user presses on a volume position (user action 7) in different statuses of the portable electronic device 100. The volume position is a specific position on the long sides. For example, when the screen of the portable electronic device 100 is turned on/off (status E), a camera of the portable electronic device 100 is launched (status C), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user presses on the volume position on one of the two long sides of the portable electronic device 100 to adjust the volume. For example, the user may press a first portion of the volume position (for example an upper portion of the one long side adjacent to the first side S1 of the portable electronic device 100) to increase the volume, or the user may press a second portion of the volume position opposite to the first portion (for example a lower portion of the one long side adjacent to the second side S2 of the portable electronic device 100) to decrease the volume.

Figure 8:
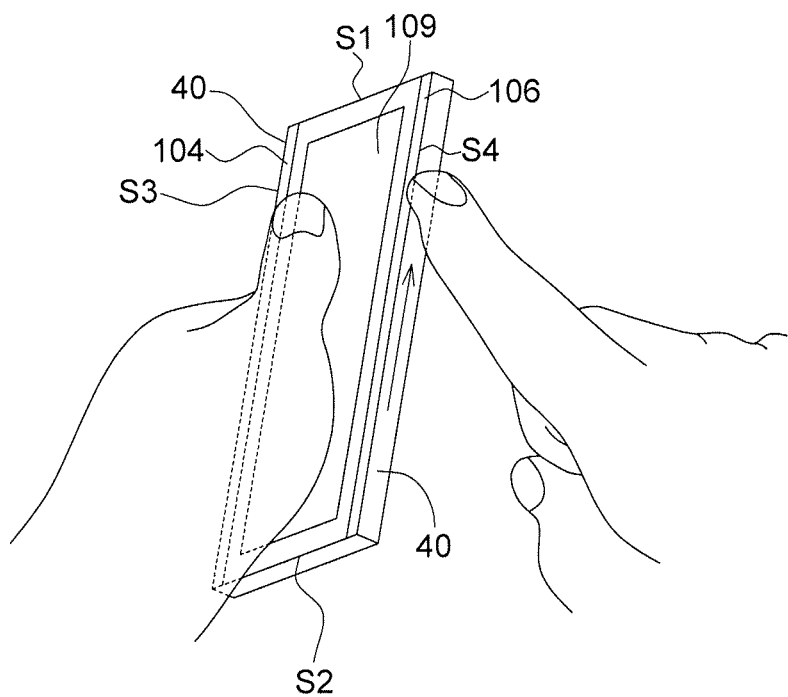
FIG. 8 shows a schematic diagram of the portable electronic device when the user finger slides on one of the two long sides of the portable electronic device quickly.

The corresponding operations are performed when the user holds the portable electronic device 100 with hands touching the third side S3 and the fourth side S4, and the user uses a finger to quickly slide on one of the two long sides (user action 8) in different statuses of the portable electronic device 100. For example, when the screen of the portable electronic device 100 is turned on/off (status B/A), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user holds the portable electronic device 100, and the user uses a finger to slide on one of the two long sides quickly to launch/dismiss the flashlight. Referring to FIG. 8, FIG. 8 shows a schematic diagram of the portable electronic device 100 when the user finger slides on one of the two long sides quickly of the portable electronic device 100. The user action "quick slide" represents that the user uses a finger to quickly slide on one of the two long sides for a distance larger than a distance threshold in a predefined period. For example, the user action "quick slide" is determined by the processor 102 when the user slides on one of the two long sides over 5 centimeters. In one embodiment, the corresponding operation for the user action "quick slide" is customizable. That is, the user can reset the corresponding operation. For example, the corresponding operation "launch/dismiss the flashlight" is reset to "turn on a silent/do not disturb (DND) mode", "turn on an airplane mode", or "turn on Wi-Fi hotspot".

Figure 9:
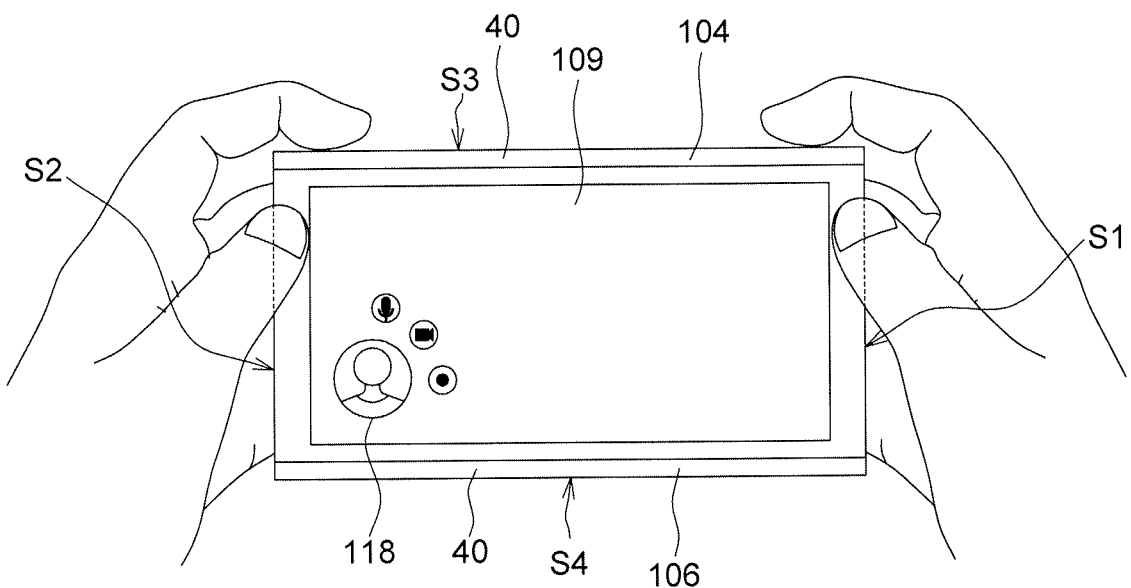
FIG. 9 shows a schematic diagram of the portable electronic device when the user presses on the left and right parts on one of the long sides simultaneously in the landscape mode of the portable electronic device.

The corresponding operations are performed when the user presses on the left and right parts on one of the long sides in the landscape mode (user action 9) in different statuses of the portable electronic device 100. For example, when the user plays the games in the landscape mode on the portable electronic device 100 (status F), the user presses the left and right parts on one of the long sides (for example, side S3) simultaneously in the landscape mode to launch the screen record widget. Referring to FIG. 9, FIG. 9 shows a schematic diagram of the portable electronic device 100 when the user presses on the left and right parts on one of the long sides simultaneously in the landscape mode of the portable electronic device 100. The screen record widget 118 is a control interface for the game.

Figure 10:
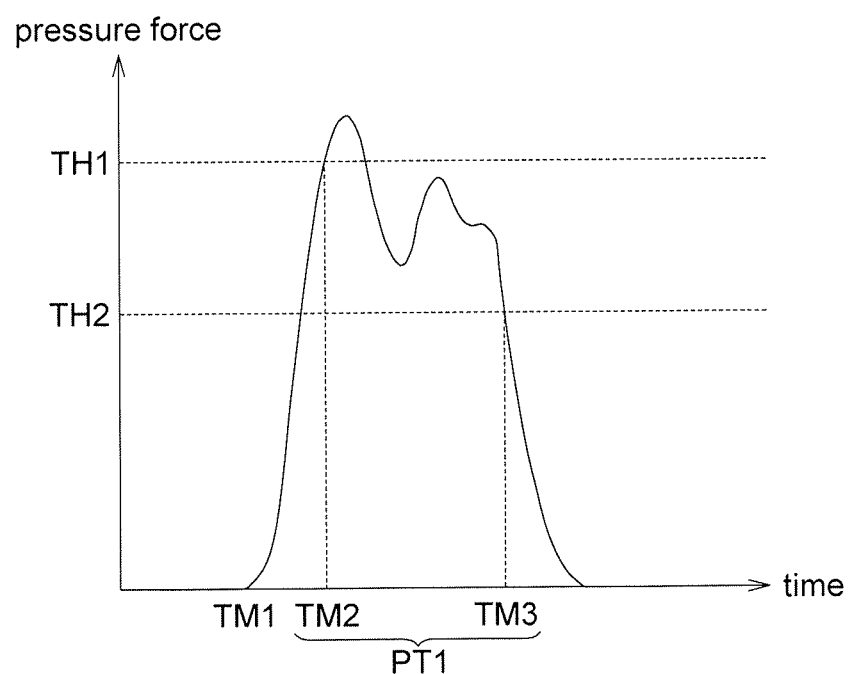
FIG. 10 shows a curve with relation of a time and pressure force according to an embodiment.

Since the user may not keep their force in the same level during squeezing, the user's force of squeeze action is not a perfect curve in real world and may be a little up and down. Therefore, in another embodiment, in order to improve the successful rate of determining whether the squeeze action is performed, different thresholds for squeezing and releasing are set. For example, referring to FIG. 10, a squeezing threshold TH1 is set for determining if a squeeze action begins, and a releasing threshold TH2 is set for determining if the squeeze action finishes. The releasing threshold TH2 is smaller than the squeezing threshold TH1.

The squeezing threshold TH1 may be set through testing user's squeezing force during a squeezing setting procedure of the portable electronic device 100. The releasing threshold TH2 may be set according to the squeezing threshold TH1.

The squeezing setting procedure may comprise asking the user to squeeze the portable electronic device 100, sensing test pressing forces F1 of user's squeezing the portable electronic device 100 with intention to trigger a functional operation of the portable electronic device 100 for several times by the sensing components, and determining a set pressing force F2 to be the squeezing threshold TH1 according to the test pressing forces F1 by the processor 102.

The set pressing force F2 may be a percentile value of the test pressing forces F1. For example, in an embodiment, the test pressing forces F1 may be 100, 150, and 200 (pressure units), and the set pressing force F2 (or the squeezing threshold TH1) is 175 (pressure units) being a percentile value of $75^{th}$ percentile calculated according to the minimum value of 100 (pressure units) and the maximum value of 200 (pressure units), The present disclosure is not limited thereto. In another embodiment, for example, the test pressing forces F1 may be 100, 150, and 200 (pressure units), and the set pressing force F2 (or the squeezing threshold TH1) is 150 (pressure units), being an average value of the three test pressing forces F1.

In an embodiment, two or more the set pressing forces F2 can be set through the squeezing setting procedures. The set pressing forces F2 may be sorted in order (for example corresponding to 100, 150, 200 (pressure units) in sequence of size) as icons in a user interface, and one (for example 150 (pressure units)) of the two or more set pressing force F2 can be selected by the user as the squeezing threshold TH1. Then, if the user feels that the one set pressing force F2 (for example 150 (pressure units)) being the squeezing threshold TH1 does not fit for actual use, the user can set another one of the two or more set pressing force F2 as the squeezing threshold TH1. For example, the user may reset 100 (pressure units) as the squeezing threshold TH1, which is lower than 150 (pressure units), as the user feels that 150 (pressure units) is too high; or reset 200 (pressure units) as the squeezing threshold TH1, which higher than 150 (pressure units), as the user feels that 150 (pressure units) is too low).

The releasing threshold TH2 may be determined by the processor 102 according to the squeezing threshold TH1. In an embodiment, the releasing threshold TH2 may be a specific ratio (smaller than 100%) of the squeezing threshold TH1. For example, the value of the releasing threshold TH2 is 75% of the value of the squeezing threshold TH1. For example, assume the squeezing threshold TH1 is 175 (pressure units), then the releasing threshold TH2 is 131.25 (pressure units).

After the squeezing threshold TH1 and the releasing threshold TH2 are set, when a pressing force of a pressing action beginning at a time point TM1 reaches the squeezing threshold TH1 at the time point TM2, the squeeze action is determined as being beginning by the processor 102. On the contrary, as the pressing force of the pressing action beginning at the time point TM1 does not reach the squeezing threshold TH1, no squeeze action is determined by the processor 102. For example, the pressing action without reaching the squeezing threshold may comprise a normal holding action on the portable electronic device 100 by the user, and no functional operation of the portable electronic device 100 is triggered or determined by the processor 102. In other words, the processor 102 determines the squeeze action as an ineffective squeeze action, and thus no corresponding predefined function is performed. As long as the pressing force after reaching the squeezing threshold TH1 is lower than the releasing threshold TH2, it is determined by the processor 102 that the squeeze action of the user finishes. In other words, the processor 102 determines the squeeze action as an effective squeeze action, and thus the corresponding predefined function is performed.

A time period PT1 between a time point TM2 and a time point TM3 corresponding to the squeezing threshold TH1 and the releasing threshold TH2 respectively is determined by the processor 102 as a time period of the squeeze action. The squeeze action can be determined by the processor 102 as a long squeeze action or a short squeeze action according to the time period PT1 between the time point TM2 and the time point TM3, comparing to a time threshold. In an embodiment, when the period time PT1 is less than or equal to 0.7 seconds as the time threshold, the squeeze action is determined to be the short squeeze action. On the contrary, when the period time PT1 is more than 0.7 seconds as the time threshold, the squeeze action is determined to be the long squeeze action.

A functional operational of the portable electronic device 100 may be determined by the processor 102 according to the squeeze action (the long squeeze action or the short squeeze action). A functional action corresponding to the sensed short/long squeeze action may be carried out by the portable electronic device 100. In another embodiment, only the long squeeze action will trigger some particular functional action of the portable electronic device 100, while only the short squeeze action will be ignored by the portable electronic device 100.

Figure 11:
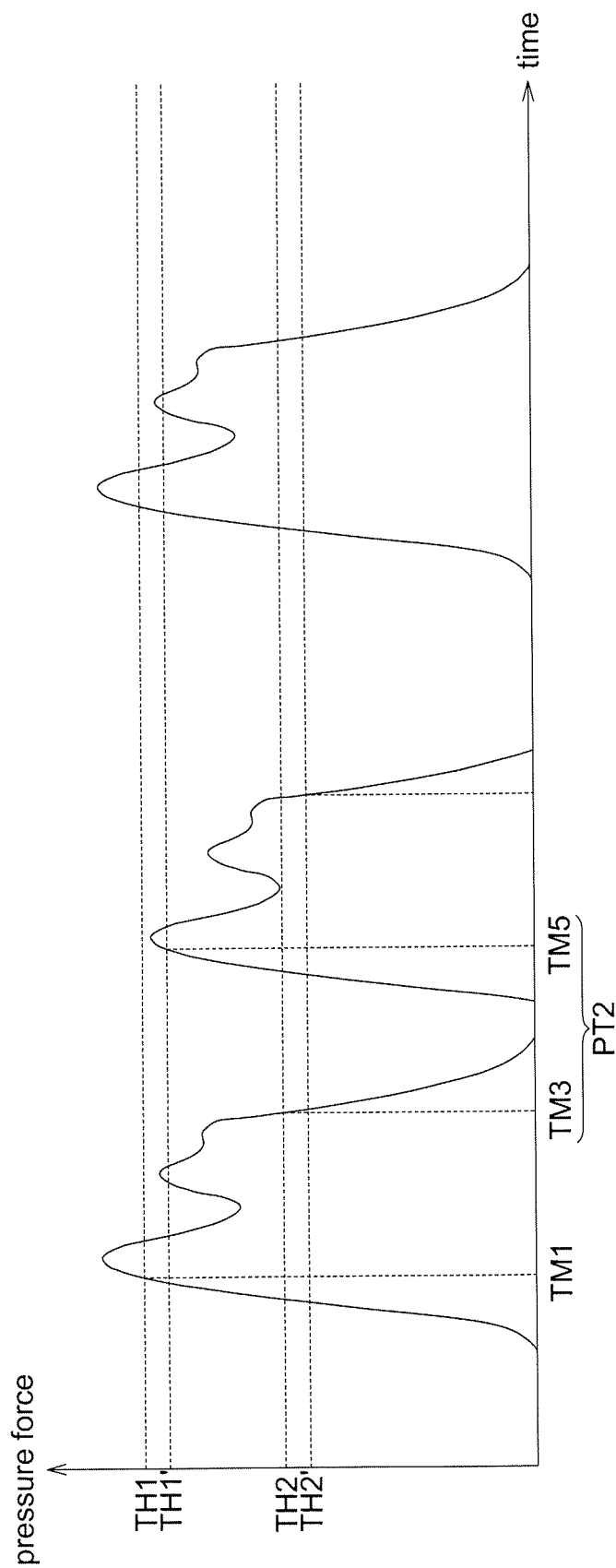
FIG. 11 shows a curve with relation of a time and pressure force according to an embodiment.

In another embodiment, the values of the squeezing threshold TH1 and the releasing threshold TH2 may be adjusted dynamically by the processor 102 according to actual operating conditions of squeezing the portable electronic device 100 by the user. For example, if two or more squeeze actions are performed by the user with a short interval, for example for carrying out a picture capturing function rapidly and continuously, a subsequent squeeze action (or subsequent squeeze actions) after the first squeeze action may be determined according to the modified squeezing threshold TH1' and the modified releasing threshold TH2' obtained according to the squeezing threshold TH1 and the releasing threshold TH2, and smaller than the squeezing threshold TH1 and the releasing threshold TH2, respectively. For example, TH1'=0.95*(TH1) and TH2'=0.95*(TH2). However, the present disclosure is not limited thereto. As shown in FIG. 11, in an embodiment, if an interval between the first squeeze action and a second squeeze action, for example determined according to a period time PT2 between a time point TM5 of the second squeeze action and time point TM3 of the first squeeze action, is shorter than a specific value, the second squeeze action can be determined by the modified squeezing threshold TH1' and the modified releasing threshold TH2'. Similarly, if an interval between the second squeeze action and a third squeeze action is shorter than the specific value, the third squeeze action can be determined by another modified thresholds TH1" and TH2" (not shown) obtained according to and smaller than the modified thresholds TH1' and TH2' respectively. For example, TH1"=0.95*(TH1') and TH2"=0.95*(TH2'). On the contrary, if the interval between the second squeeze action and the third squeeze action is larger than the specific value, the third squeeze action can be determined to be another first squeeze action that can be determined by the thresholds TH1 and TH2.

Figure 12:
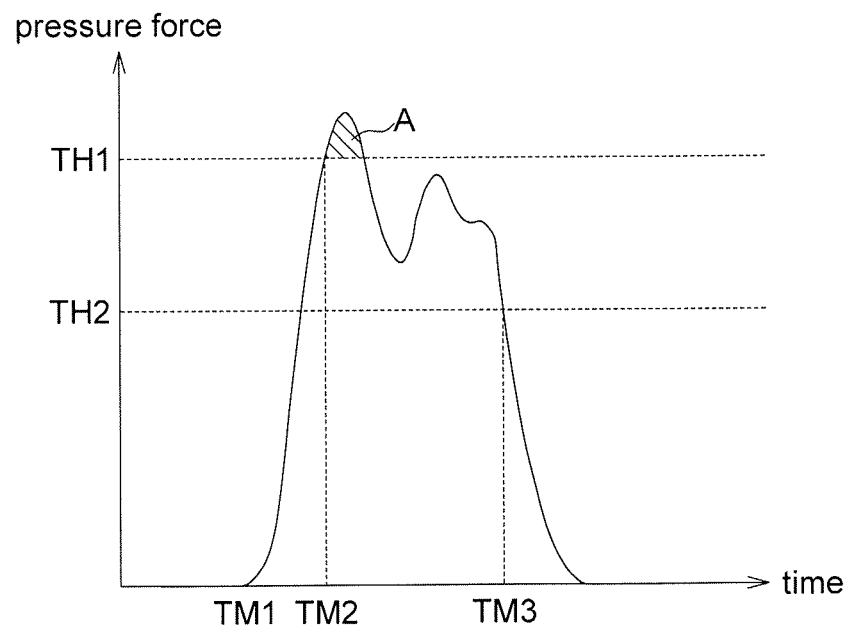
FIG. 12 shows a curve with relation of a time and pressure force according to an embodiment.

In another embodiment, the squeezing threshold can be adjusted dynamically. A squeezing threshold other than the squeezing threshold TH1 obtained by the setting procedure can be dynamically adjusted according to use's usual squeeze action not for the setting. For example, an average value of an area A (FIG. 12) defined by the squeezing curve and the squeezing threshold TH1 is compared to a fixed specific value. For example, the average value of an area A may be a pressure unit value calculated by dividing the area A by the time period of the area A. As the average value of the area A is smaller than the fixed specific value, a squeezing threshold is adjusted dynamically to be lower than the original squeezing threshold TH1, and then a subsequent squeeze action is determined according to the adjusted squeezing threshold. Similarly, as the average value of the area A is more than the fixed specific value, a squeezing threshold is adjusted to be higher than the original squeezing threshold TH1, and then a subsequent squeeze action is determined according to the adjusted squeezing threshold. The squeezing threshold is not limited to the foregoing dynamic adjusting method, and may be decided according to other statistics schemes.

In an embodiment, a curve judged to be resulted from an un-normal squeeze action is not considered for dynamically adjusting the squeezing threshold. For example, it is judged according to a curvature value of a top point of the curve corresponding the area A, or a slope value of a portion near the top point of the curve. As the curvature value or the slope value is smaller than a fixed specific value, the squeeze action is determined as being an un-normal action, and therefore data obtained from which is not considered for dynamically adjusting the squeezing threshold.

Figure 13A:
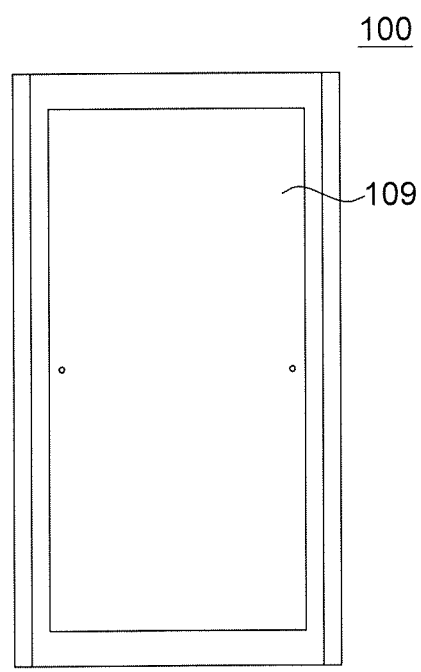
FIG. 13A to 13I show visual images shown on a touch display screen and varying in order during a pressing action on the portable electronic device.
Figure 13B:
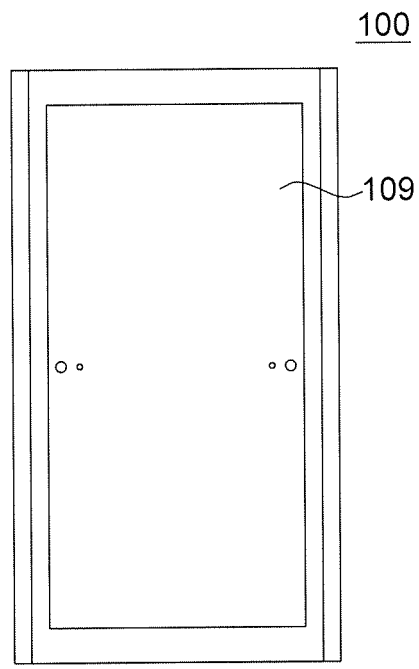
Figure 13C:
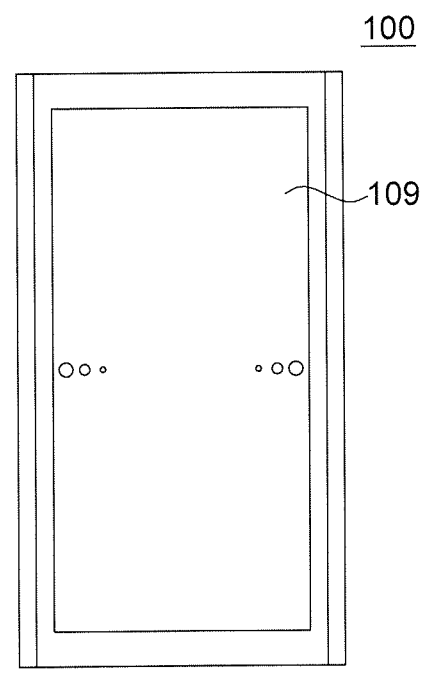
Figure 13D:
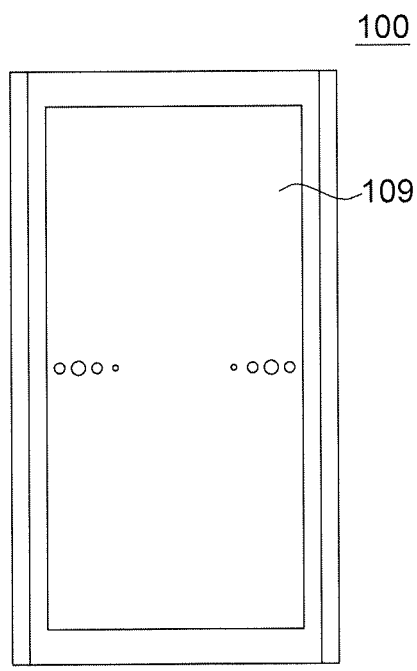
Figure 13E:
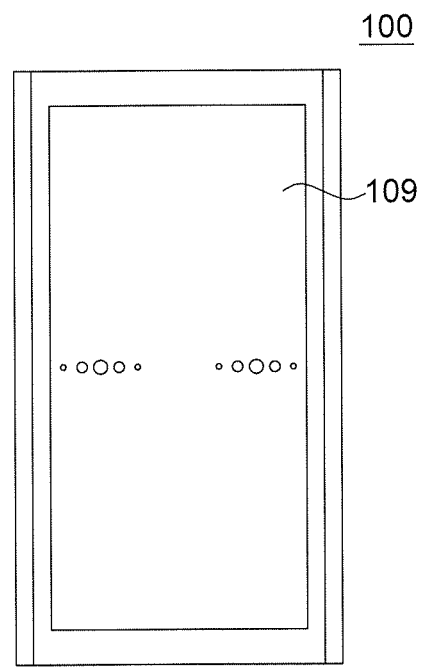
Figure 13F:
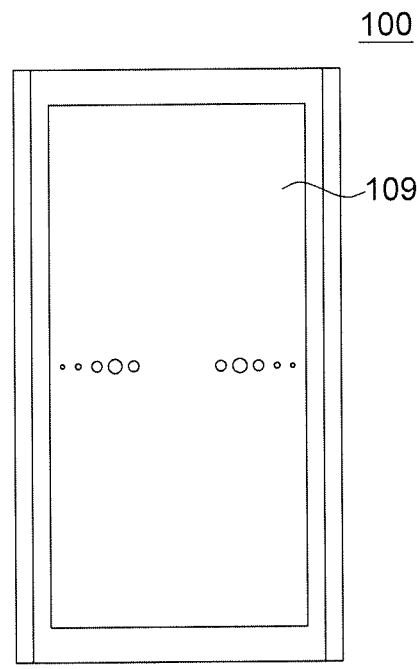
Figure 13G:
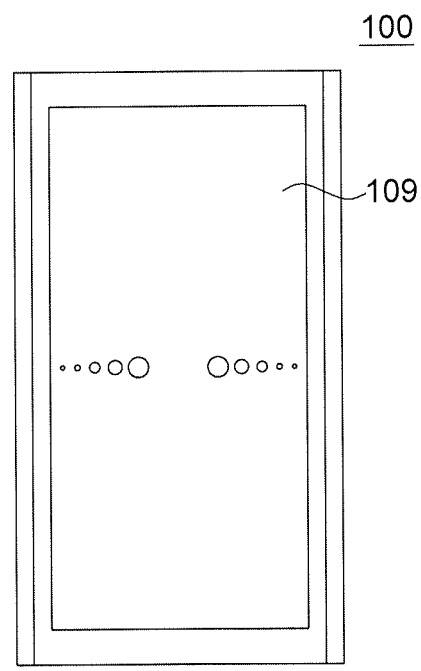
Figure 13H:
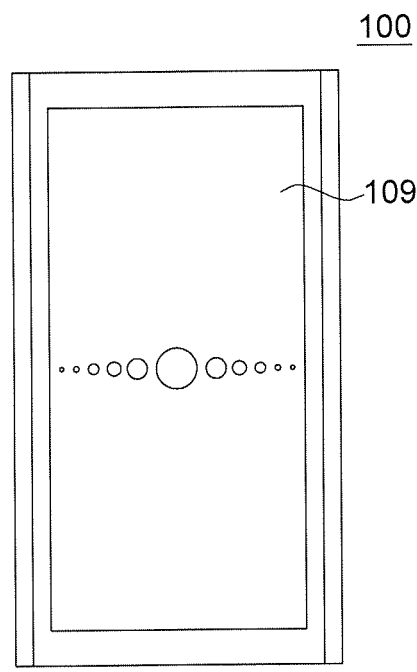
Figure 13I:
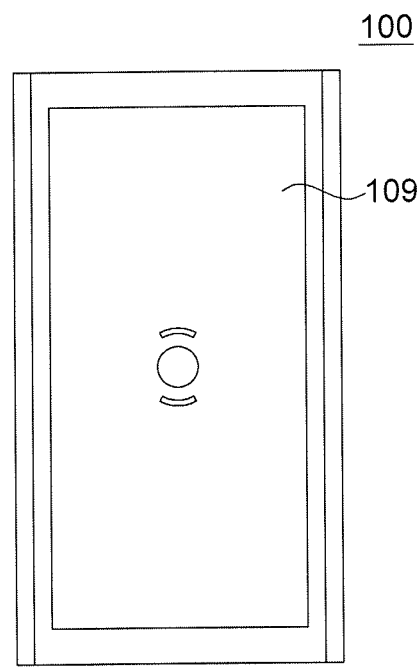
Figure 14A:
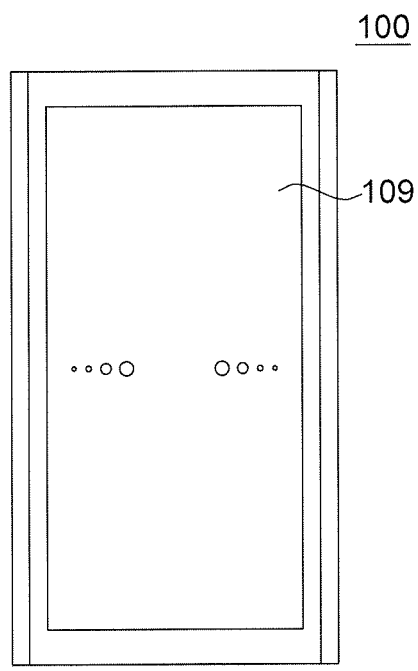
FIG. 14A to FIG. 14D show visual images shown on a touch display screen and varying in order during a pressing action on the portable electronic device.
Figure 14B:
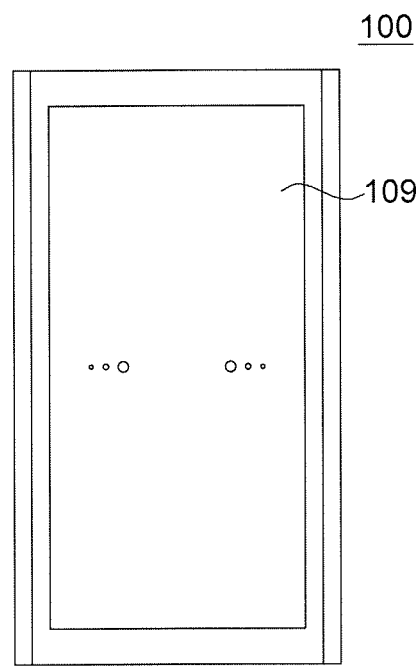
Figure 14C:
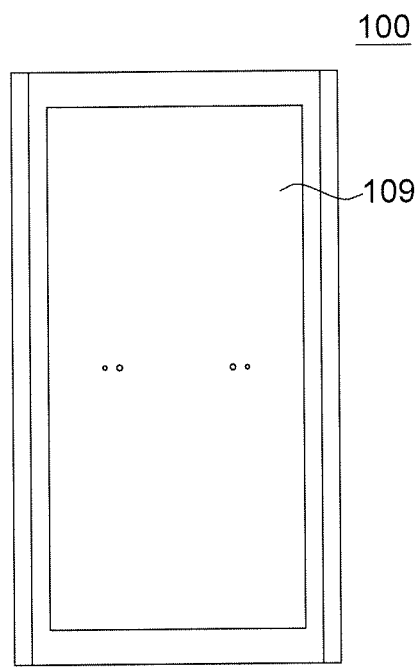
Figure 14D:
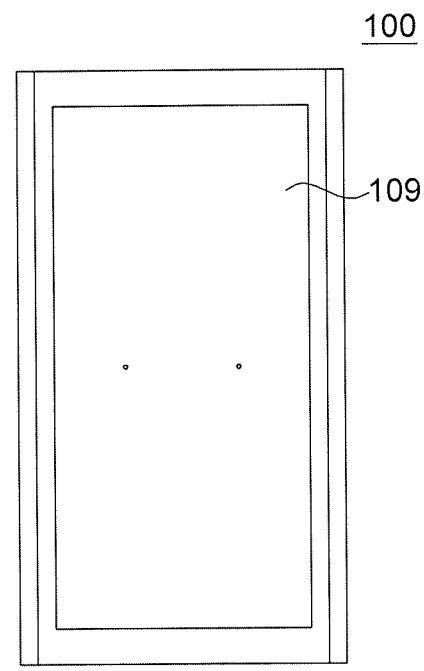
Figure 15:
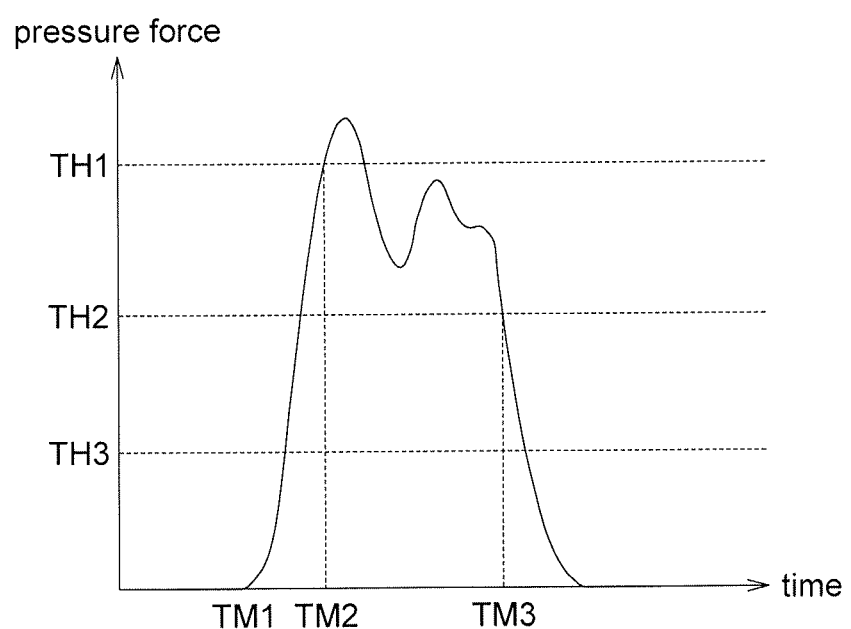
FIG. 15 shows a curve with relation of a time and pressure force according to an embodiment.

The pressing force during the pressing action can be shown as a visual image in the touch display screen 109 of the portable electronic device 100. In an embodiment, the touch display screen 109 starts displaying an initial visual image (FIG. 13A) corresponding to a specific fixed pressure force TH3 as shown in FIG. 15. The specific pressure force TH3 is lower than any one of the thresholds (such as TH1, TH1', TH1", etc., TH2, TH2', TH2", etc.) for determining whether the squeeze action is performed. The specific pressure force TH3 may be a fixed predetermined value without considering the setting procedure performed by the user. In a successful squeezing process, when the pressing force increases from the specific pressure force TH3, the visual image gradually changes to be images as shown in FIG. 13B to FIG. 13G in sequence, and further changes to be images as shown in FIG. 13H to FIG. 13I when the pressing force reaches to the threshold TH1 for indicating that the effective squeezing action is performed, and the predefined function is performed. In an un-successful squeezing process, for example, when the pressing force increases from the specific pressure force TH3, the visual image gradually changes to be images as shown in FIG. 13B to FIG. 13G in sequence, and further changes to be gradually disappearing images as shown in FIG. 14A to FIG. 14D in sequence when the pressing force disappears at a time point shortly after the time point corresponding FIG. 13D, indicating that no effective squeezing action is performed, and thus no predefined function is performed.

Figure 16:
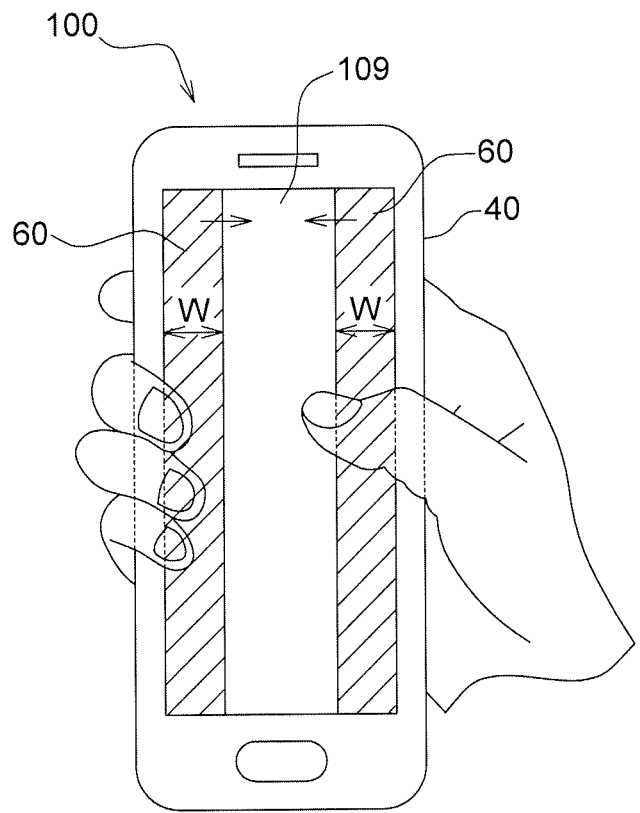
FIG. 16 shows a schematic diagram of a portable electronic device having a particular area to an embodiment of the invention.

Referring to FIG. 16, the touch function of a particular area of touch display screen 109 may be disabled according to a pressing action sensed by the edge sensor 40 of the portable electronic device 100. For example, the touch function of a region 60 adjacent to the edge sensor 40 is disabled when the processor 102 via the first sensor 104 and/or the second sensor 104 determines that the force of the pressing action (or squeeze action) is higher than a predefined value (e.g., threshold TH1), while a display function of the touch display screen 109 may be still active. The processor 102 restores the touch function of a region 60 adjacent to the edge sensor 40, when the force of the pressing action (or squeeze action) is smaller than a predefined value (e.g., threshold TH2). In other words, the touch function of the region 60 may be disabled during a time period between the time point corresponding to the threshold TH1 and the time point corresponding to the threshold TH2, and then be restored after the time point corresponding to the threshold TH2. In an embodiment, the touch function of a region 60 is disabled in the time period PT1 shown in FIG. 10. In an embodiment, with corresponding to a gradually increased pressing force, an area of the region 60 is gradually increased as being extended towards a center of the touch display screen 109 from the edge of the touch display screen 109. In other words, the width W of the region 60 may be increased as the pressing force increases sensed by the first sensor 104 and/or the second sensor 104. In another embodiment, the touch function of the whole touch display screen 109 is disabled as long as the processor 102 determines that the force of the pressing action (or the squeeze action) is higher than a predefined value (e.g., threshold TH1) without considering the change of the squeezing force.

In an embodiment, when a plugging-in event or a plugging-out event of a peripheral device is detected by the portable electronic device, a squeezing event sensed by the edge sensor is ignored. The squeezing event may be generated when the squeeze action sensed by the edge sensor occurs during a first time period. The plugging-in event or the plugging-out event occurs during the first time period. The squeeze action may begin within a second time period after the plugging-in event or the plugging-out event occurs.

Figure 17:
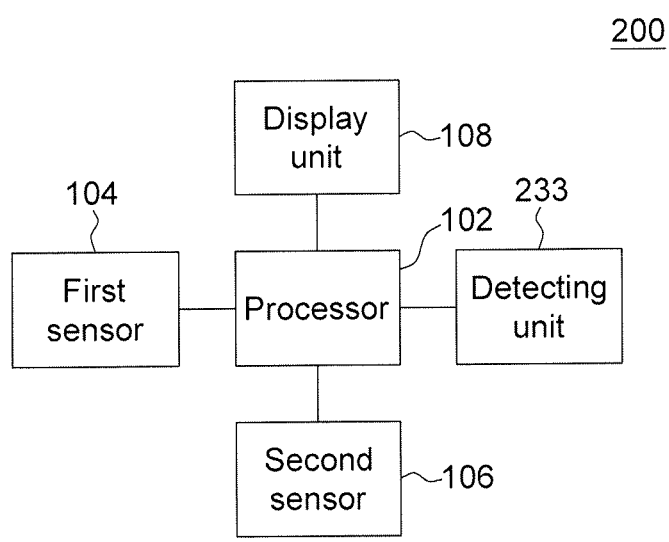
FIG. 17 shows the block diagram of the portable electronic device according to another embodiment of the invention.

Referring to FIG. 17, FIG. 17 shows the block diagram of the portable electronic device 200 according to another embodiment of the invention. The portable electronic device 200 further includes a detecting unit 233. For example, the detecting unit 233 may be a detecting circuit for a port of USB, earphone, or other ports, for detecting a plugging-in event and a plugging-out event of a hardware element. The processor 102 electrically coupled to the first sensor 104, the second sensor 106, the display unit 108, and the detecting unit 233.

Figure 18:
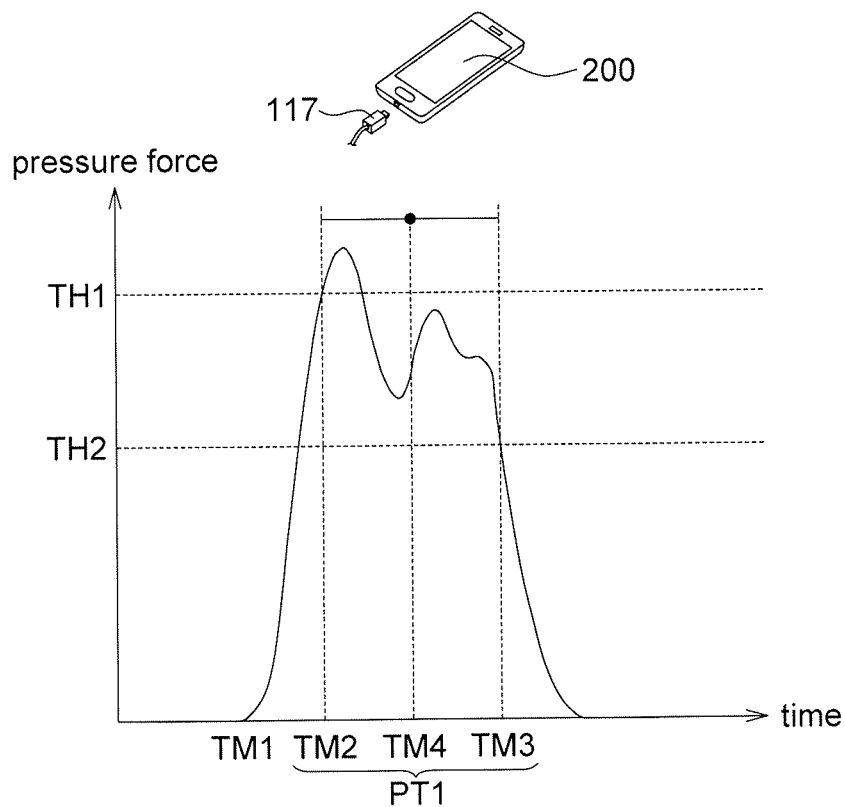
FIG. 18 shows a curve with relation of a time and pressure force according to an embodiment.

For example, referring to FIG. 18, in an embodiment, as a peripheral device 117 (as a client, for example a USB device) which is, for example, an earphone, a lighting device, an electric fan, or a flash drive etc., is detected by the detecting unit 233 to be plugged in or plugged out from the portable electronic device 200 (as a host) at a time point TM4 during the period time PT1, the squeezing event sensed by the edge sensor is ignored. For example, the edge sensor 40 is disabled. Alternatively, the functional action corresponding to the sensed (short/long) squeezing event is canceled (not carried out) by the portable electronic device 200.

In an embodiment, when the plugging-in event or the plugging-out event of the peripheral device 117 is detected by the portable electronic device 200 at a timing point TM4, the edge sensor 40 is disabled for a time period beginning at the timing point TM4, for example between the timing point TM4 and the timing port TM3, or between the timing point TM4 and a timing point later than the timing port TM3.

For example, the USB driver of the peripheral device 117 can inform a plugging in or plugging out event to a sensor hub as it happens, and no functional action correspond the state sensed by the edge sensor 40 is triggered to the portable electronic device 200. That is, the squeeze action around the time point TM4 which is between the time point TM2 and the time point TM3 is ignored. In an embodiment, the squeeze action after the time point TM4 with a specific time interval is ignored. For example, the squeeze action during a timing period between the timing point TM4 and the timing port TM3 may be ignored. The squeeze action during a timing period between the timing point TM4 and a timing point later than the timing port TM3 may be ignored. Alternatively, the squeeze action after the timing port TM3 may be ignored.

Figure 19:
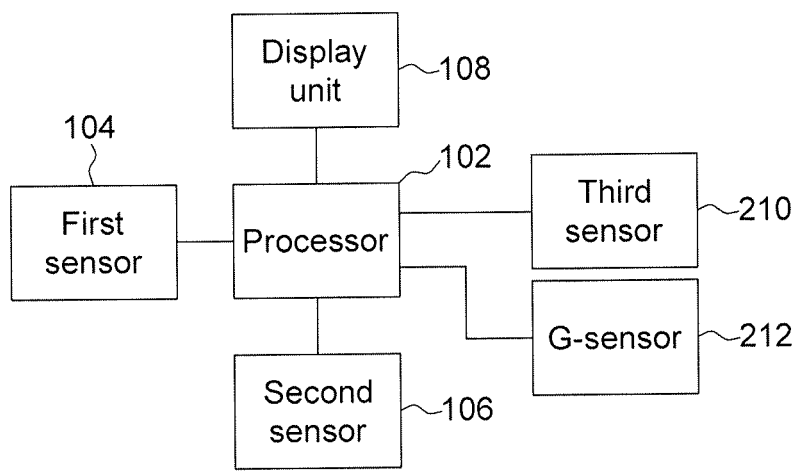
FIG. 19 shows the block diagram of the portable electronic device according to another embodiment of the invention.
Figure 21:
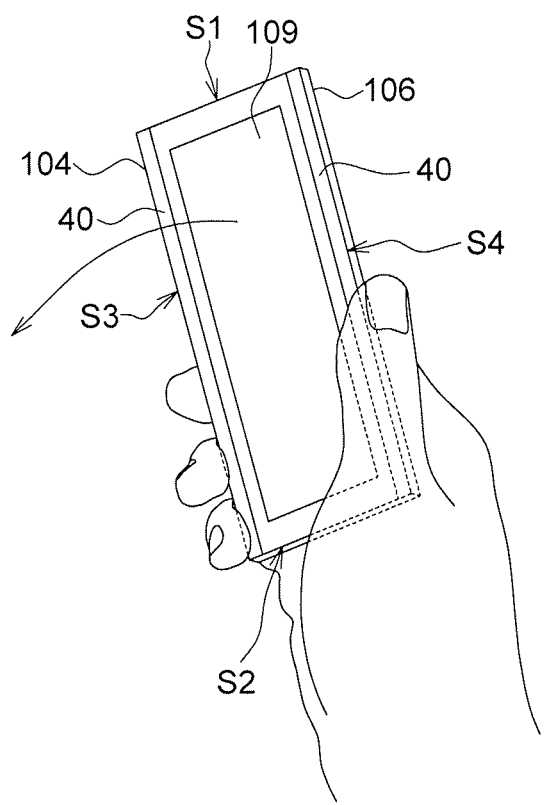
FIG. 21 shows a schematic diagram of the portable electronic device when the user squeezes and flips the portable electronic device.
Figure 22:
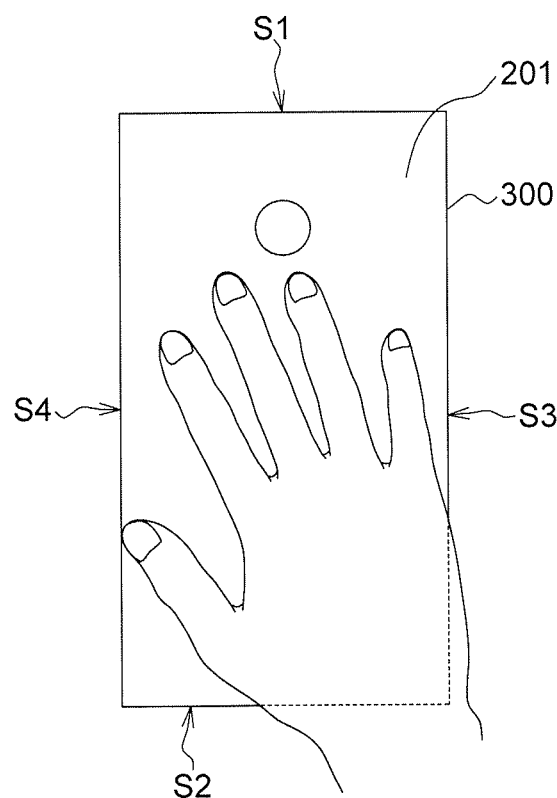
FIG. 22 shows a schematic diagram of the portable electronic device when the user palms the portable electronic device.

Referring to FIG. 19, FIG. 19 shows the block diagram of the portable electronic device 300 according to another embodiment of the invention. The portable electronic device 300 further includes a third sensor 210 and a G sensor 212. The processor 102 electrically coupled to the first sensor 104, the second sensor 106, the display unit 108, the third sensor 210 and the G sensor 212. The third sensor 210 is, for example, a resistive sensor or an ultrasonic sensor. The third sensor 210 is disposed under the rear cover of the portable electronic device 300. The third sensor 210 includes a number of sensing components which are arranged in twodimension. When the user touches the rear cover of the portable electronic device 300, these sensing components of the third sensor 210 output the signals. The processor 102 determines whether the user touches the rear cover of portable electronic device 300 (for example palms or taps the rear cover as shown in FIG. 22) according to the signals outputted from the third sensor 210. Besides, the processor 102 determines whether the portable electronic device 300 is shook or flipped (as shown in FIG. 21) according to the signals outputted from the G sensor 212 and/or other suitable motion sensors such as an acceleration sensor, a vibration sensor, a shake sensor, etc.

TABLE 2-1

| User action | Status |  |  |  |
|---|---|---|---|---|
|  | Screen off (A) | Screen on (Global) (B) | Camera (C) | Video (D) |
| Double tap (10) | None | Zoom in (depends on screen) | Zoom in | Zoom in |
| Double tap and slide (11) | None | Zoom in/out (depends on screen) | Zoom in/out | Zoom in/out |
| Hold and shake (12) | Boost | Boost | Boost | Boost |
| Squeeze and flip the device (13) | None | None | Switch camera | None |
| Flip and palm the device (14) | Silent mode | Silent mode | Silent mode | Silent mode |

TABLE 2-2

| User action | Status |  |  |  |
|---|---|---|---|---|
|  | Music (E) | Gaming (F) | Incall (G) | Alarm/alert (H) |
| Double tap (10) | None | Zoom in (depends on game) | None | None |
| Double tap and slide (11) | None | Zoom in/out (depends on game) | None | None |
| Hold and shake (12) | Boost | Boost | Boost | None |
| Squeeze and flip the device (13) | None | None | None | None |
| Flip and palm the device (14) | Silent mode | Silent mode | Silent mode | Silent mode |

TABLE 2-3

| User action | Status |  |  |  |
|---|---|---|---|---|
|  | Incoming call (I) | IM/ Message with IME (J) | IM/ Message without IME (K) | Web/photo (L) |
| Double tap (10) | None | None | None | Zoom in |
| Double tap and slide (11) | None | None | None | Zoom in/out |
| Hold and | Boost | Boost | Boost | Boost |

TABLE 2-3-continued

| User action | Status |  |  |  |
|---|---|---|---|---|
|  | Incoming call (I) | IM/ Message with IME (J) | IM/ Message without IME (K) | Web/photo (L) |
| shake (12) |  |  |  |  |
| Squeeze and flip the device (13) | None | None | None | None |
| Flip and palm the device (14) | Silent mode | Silent mode | Silent mode | Silent mode |

Referring to FIG. 19 and Tables 2-1, 2-2 and 2-3, the corresponding operations are performed when the user double taps the rear cover (user action 10) in different statuses of portable electronic device 300. For example, when the screen of the portable electronic device 300 is turned on (status A), the camera of the portable electronic device 300 is launched (status C), the user watches the video (status D), plays the games on the portable electronic device 300 (status F), or the user browses the web/photo (status L), the user double taps on the rear cover of the portable electronic device 300 to zoom in the content displayed on the display unit 108.

The corresponding operations are performed when the user double taps the rear cover, and the user uses a finger to slide on a long side of the portable electronic device 300 (user action 11) in different statuses of portable electronic device 300. For example, when the screen of the portable electronic device 300 is turned on (status B), the camera of the portable electronic device 300 is launched (status C), the user watches the video (status D), plays the games on the portable electronic device 300 (status F), or the user browses the web/photo (status L), the user double taps on the rear cover, and a finger slides on a long side of the portable electronic device 300 to zoom in/out the content displayed on the display unit 108.

The corresponding operations are performed when the user holds the portable electronic device with hands touching the third side S3 and the fourth side S4 and shakes the portable electronic device 300 (user action 12) in different statuses of portable electronic device 300. For example, when the screen of the portable electronic device 300 is turned on/off (status B/A), a camera of the portable electronic device 300 is launched (status C), the user watches the video (status D), listens to the music (status E), plays the games on the portable electronic device 300 (status F), the user is in a call (status G), the user has an incoming call (status I), the user writes the IM/message with IME (status J), the user writes the IM/message without IME (status K), or the user browses the web/photo (status L), the user holds and shakes the portable electronic device 300 to boost the portable electronic device 300. That is, the user holds and shakes the portable electronic device 300 to enhance data connection, clean the RAM, increase antenna strength, increase CPU/GPU power temporary. In one embodiment, the corresponding operation for the user action "hold and shake" is customizable. That is, the user can reset the corresponding operation. For example, the corresponding operation "boost" is reset to "change theme/wallpaper".

Figure 20:
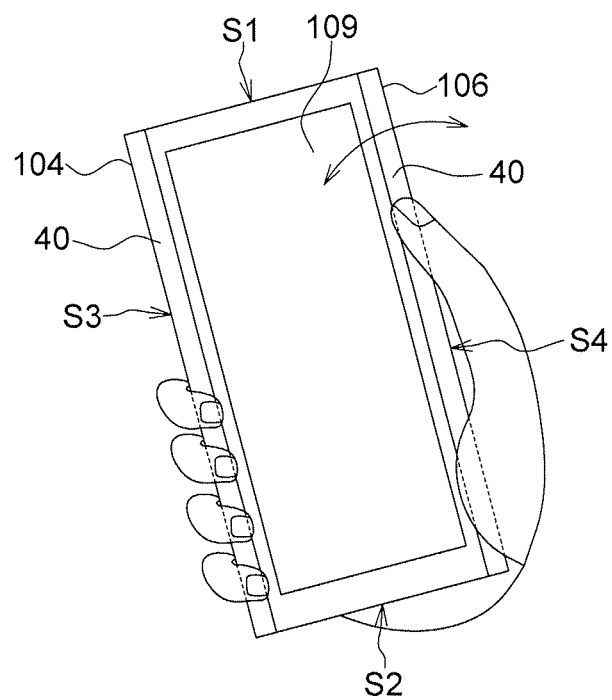
FIG. 20 shows a schematic diagram of the portable electronic device when the user holds and shakes the portable electronic device.

Referring to FIG. 20, FIG. 20 shows a schematic diagram of the portable electronic device 300 when the user holds and shakes the portable electronic device 300.

The corresponding operation is performed when the user squeezes the long sides of the portable electronic device 300 and flips the portable electronic device 300 from the back to the front (user action 13) or from the front to the back in a status of portable electronic device 300. For example, when the camera of the portable electronic device 300 is launched (status C), the user squeezes and flips the portable electronic device 300 to switch between main camera and front camera. Referring to FIG. 21, FIG. 21 shows a schematic diagram of the portable electronic device 300 when the user squeezes and flips the portable electronic device 300.

The corresponding operations are performed when the user flips and palms the portable electronic device 300 (user action 14) in different statuses of portable electronic device 300. For example, when the screen of the portable electronic device 300 is turned on/off (status B/A), a camera of the portable electronic device 300 is launched (status C), the user watches the video (status D), listens to the music (status E), plays the games on the portable electronic device 300 (status F), the user is in a call (status G), an alarm/alert rings (status H), the user has an incoming call (status I), the user writes the IM/message with IME (status J), the user writes the IM/message without IME (status K), or the user browses the web/photo (status L), the user flips and palms the portable electronic device 300 respectively detected by the G sensor 212 and the third sensor 210 to turn on a silent mode without pressing any icon or hardware button of the portable electronic device 300. Referring to FIG. 22, FIG. 22 shows a schematic diagram of the portable electronic device 300 when the user palms the portable electronic device 300. For example, the user flips the portable electronic device 300 and places the portable electronic device 300 on a plane, for example a table, and palms on the rear cover 201 of the portable electronic device 300 to turn on the silent mode of the portable electronic device 300 when the user has a meeting.

In an embodiment, when it is sensed that the portable electronic device 300 is in a stationary state for a period of time by the G sensor 212, the edge sensor 40 of the portable electronic device 300 is disabled. In an embodiment, when it is sensed by the G sensor 212 that the portable electronic device 300 is changed from the stationary state to a non-stationary state, the squeezing event occurring within a time period after the time point of starting being in the non-stationary state is ignored.

A (x, y, z) coordinate of the portable electronic device 300 can be sensed by using a G sensor in the portable electronic device 300. If the coordinate of the portable electronic device 300 is sensed by the G sensor as being at (x, y, z)=(0, 0, 9.8) for a period of time, it can be judged that the portable electronic device 300 is rested on a supporter such as a desk, table, etc., for a period of time, and the edge sensor 40 is disabled during resting state.

If the portable electronic device 300 is judged as being in a resting state by the processor 102 according to the coordinate of the portable electronic device 300, as the portable electronic device 300 is suddenly moved as being in a non-resting state, during a period time after the non-resting state occurs, the edge senor 40 is disabled or the squeeze action sensed by the edge sensor 40 is ignored by the processor 102, and no predefined function is performed, even it is sensed that the pressing force of the squeeze action reaches the squeezing threshold TH1.

For example, the moving action of the portable electronic device 300 occurring from the resting state may be generated due to a taking-away action of the portable electronic device 300 from the supporter by the user, etc.

The G sensor in the portable electronic device 300 may be used to sense an amount of movement (changed quantity of G-value) of the portable electronic device 300. In an embodiment, if the changed quantity of G-value reaches a specific quantity GV during the instantaneous moving action, an interrupt mode is determined by the processor 102 to disable the edge sensor 40 or disable the touch function of the portable electronic device 300 corresponding to the squeeze action sensed.

If the amount of movement (changed quantity of G-value) of the portable electronic device 300 sensed by the G sensor is judged to be resulted from a user's action not being a normal squeeze action (for example, a holding action of the user with fast swing arms during exercising), the processor 102 disables the edge sensor 40 or the touch function of the portable electronic device 300 corresponding to the squeeze action.

The G sensor of the portable electronic device 300 may be used to sense an orientation angle of the portable electronic device 300. If the G sensor senses the coordinate of the portable electronic device 300 as being equals to (0, 0, −9.8), the processor 102 determines that the touch display screen 109 faces down to a ground. Accordingly, the processor 102 disables the edge sensor 40 or the touch function of the portable electronic device 300 corresponding to the squeeze action.

Figure 23:
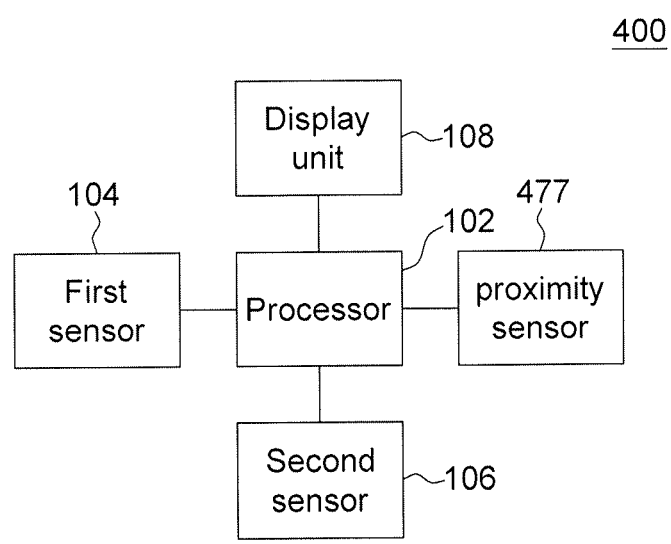
FIG. 23 shows the block diagram of the portable electronic device according to another embodiment of the invention.

Referring to FIG. 23, FIG. 23 shows the block diagram of the portable electronic device 400 according to another embodiment of the invention. The portable electronic device 400 further includes a proximity sensor 477. The processor 102 electrically coupled to the first sensor 104, the second sensor 106, the display unit 108 and the proximity sensor 477. The proximity sensor 477 may detect objects by emitting an electrostatic or electromagnetic field and monitoring the behavior of the generated field over a period of time. Thus, an object near the device will change the generated field as the object approaches the proximity sensor 477.

The proximity sensor 477 of the portable electronic device 400 may be used to detect an external object placed in proximity to the front face of the portable electronic device 400. If it is judged by the proximity sensor 477 that the portable electronic device 400 is in a near sate to the external object (for example, when the portable device is put in a pocket of the user) during a pressing action sensed by the edge sensor 40, then the edge sensor 40 or the touch function of the portable electronic device 400 corresponding to the squeeze action determined by the processor 102 is disabled during the near state of the portable electronic device 400. In an embodiment, if it is judged by the proximity sensor 477 that the portable electronic device 400 is in the near sate to the external object, during the near sate, the edge sensor 40 or the touch function of the portable electronic device 400 corresponding to the squeeze action determined by the processor 102 is disabled and the touch display screen 109 is screened off even though the portable electronic device 400 receives an incoming call.

In an embodiment, when the user holds the portable electronic device on the first sensor 104 or/and the second sensor 106 and some contents are displayed, a standby mode of the portable electronic device is delayed, such that the display unit 108 is not turned off when the user reads the contents. In an embodiment, when the screen of the portable electronic device is turned off, the user squeezes the portable electronic device on the first sensor 104 and the second sensor 106 to wake up the portable electronic device. In an embodiment, when the user has an incoming call, the user holds the portable electronic device on the first sensor 104 or/and the second sensor 106 and puts the portable electronic device close to the ear detected by the proximity sensor 477 to answer the incoming call without tapping the answer icon. In an embodiment, when the user holds the portable electronic device on the first sensor 104 or/and the second sensor 106, the left hand or the right hand is identified to match the most possible angel of fingerprint, to fasten the fingerprint recognition. In an embodiment, when the fingers fading the hold, it is determined that the user is falling asleep. In an embodiment, when the user is in dangerous, the user squeezes the portable electronic device on the first sensor 104 and the second sensor 106 for 5 seconds for SOS.

Figure 24:
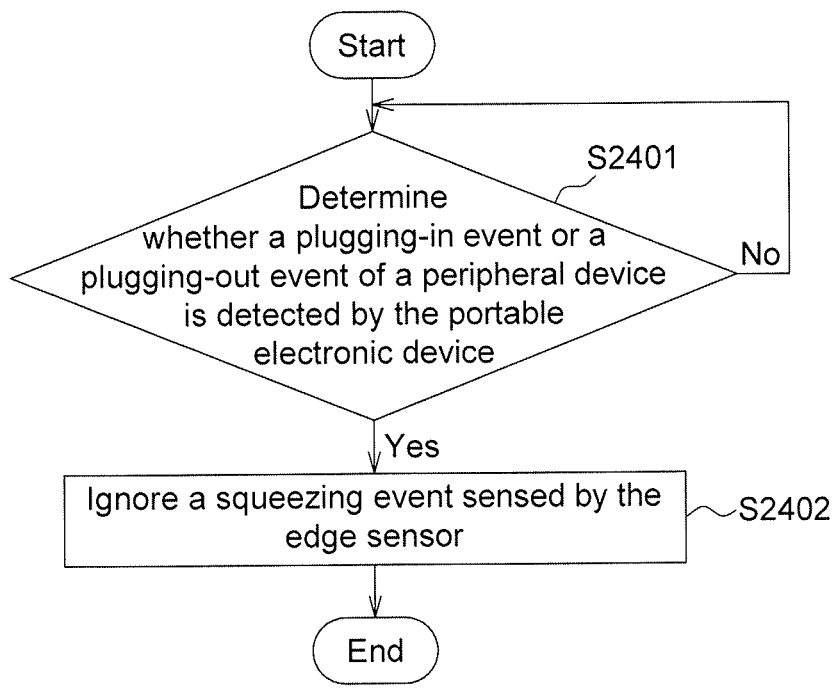
FIG. 24 shows a flowchart of an operating method for a portable electronic device.

In another embodiment, an operating method for a portable electronic device is provided. Referring to FIG. 24, a flowchart of an operating method for a portable electronic device is shown. The portable electronic device includes a body and an edge sensor disposed adjacent to an edge of the body. The operating method is described with the following steps. In step S2401, it is determined that whether a plugging-in event or a plugging-out event of a peripheral device is detected by the portable electronic device. If yes, step S2402 is performed. In step S2402, a squeezing event sensed by the edge sensor is ignored. The squeezing event is generated when a squeeze action sensed by the edge sensor occurs during a first time period. The plugging-in event or the plugging-out event occurs during the first time period or the squeeze action begins within a second time period after the plugging-in event or the plugging-out event occurs.

Figure 25:
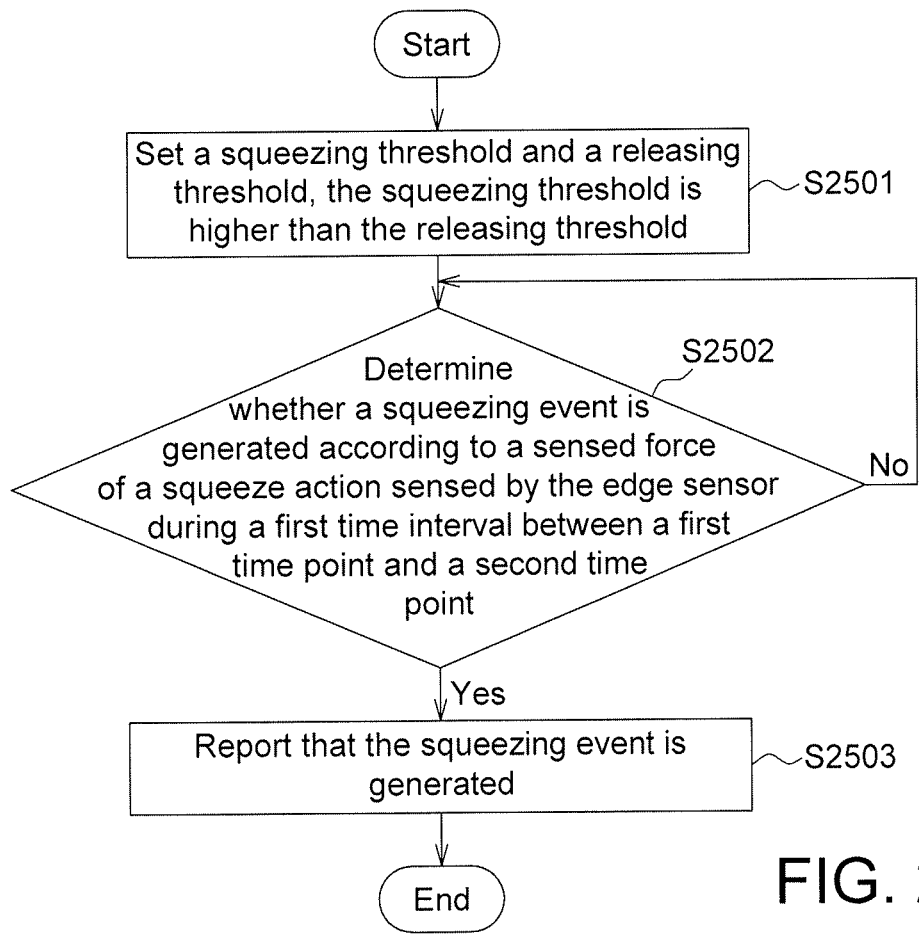
FIG. 25 shows a flowchart of an operating method for a portable electronic device.

In still another embodiment, an operating method for a portable electronic device is provided. Referring to FIG. 25, a flowchart of an operating method for a portable electronic device is shown. The portable electronic device includes a body and an edge sensor disposed adjacent to an edge of the body. The operating method is described with the following steps. In step S2501, a squeezing threshold and a releasing threshold are set. The squeezing threshold is higher than the releasing threshold. In step S2502, whether a squeezing event is generated according to a sensed force of a squeeze action sensed by the edge sensor during a first time interval between a first time point and a second time point is determined. If yes, step S2503 is performed. In step S2503, it is reported that the squeezing event is generated. The sensed force at the first time point reaches the squeezing threshold. The sensed force at the second time point reaches the releasing threshold. The second time point is later than the first time point, and the sensed force is higher than the releasing threshold during the first time period.

Figure 26:
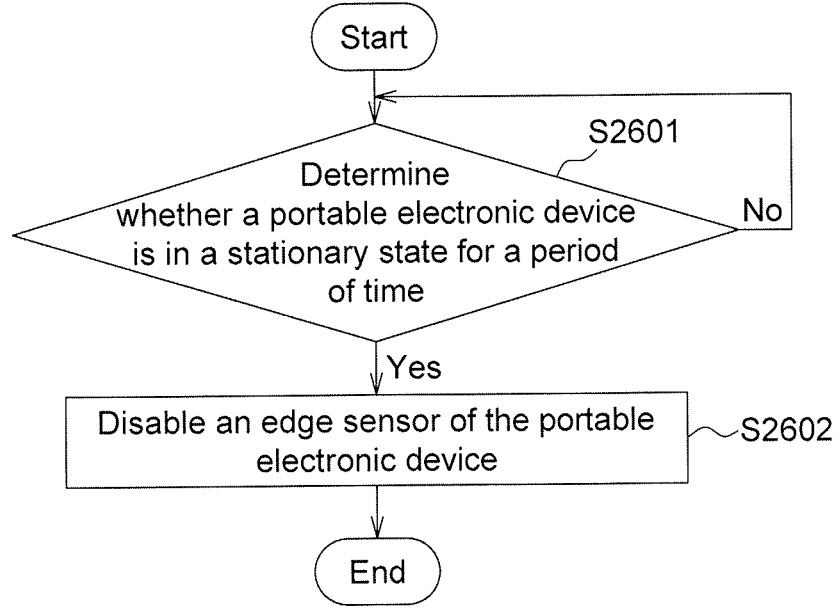
FIG. 26 shows a flowchart of an operating method for a portable electronic device.

In an embodiment, an operating method for a portable electronic device is provided. Referring to FIG. 26, a flowchart of an operating method for a portable electronic device is shown. The operating method is described with the following steps. In step S2601: it is determined that whether a portable electronic device is in a stationary state for a period of time. If yes, step S2602 is performed. In step S2602, an edge sensor of the portable electronic device is disabled.

Figure 27:
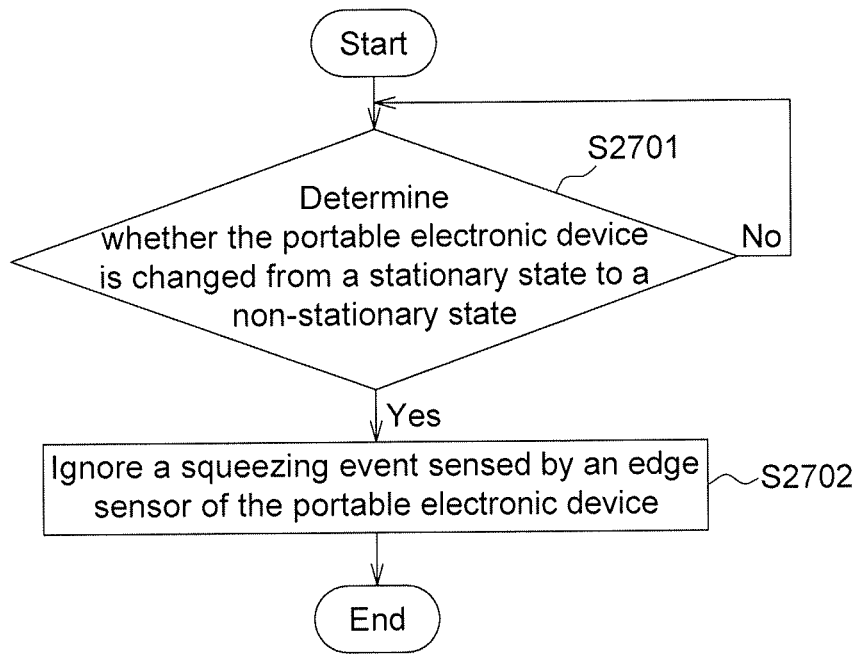
FIG. 27 shows a flowchart of an operating method for a portable electronic device.

In an embodiment, an operating method for a portable electronic device is provided. Referring to FIG. 27, a flowchart of an operating method for a portable electronic device is shown. The operating method is described with the following steps. In step S2701: it is determined that whether a portable electronic device is changed from a stationary state to a non-stationary state. If yes, step S2702 is performed. In step S2702, a squeezing event sensed by the edge sensor is ignored. The squeezing event occurs within a time period after the time point at which the non-stationary state of the portable electronic device starts.

Figure 28:
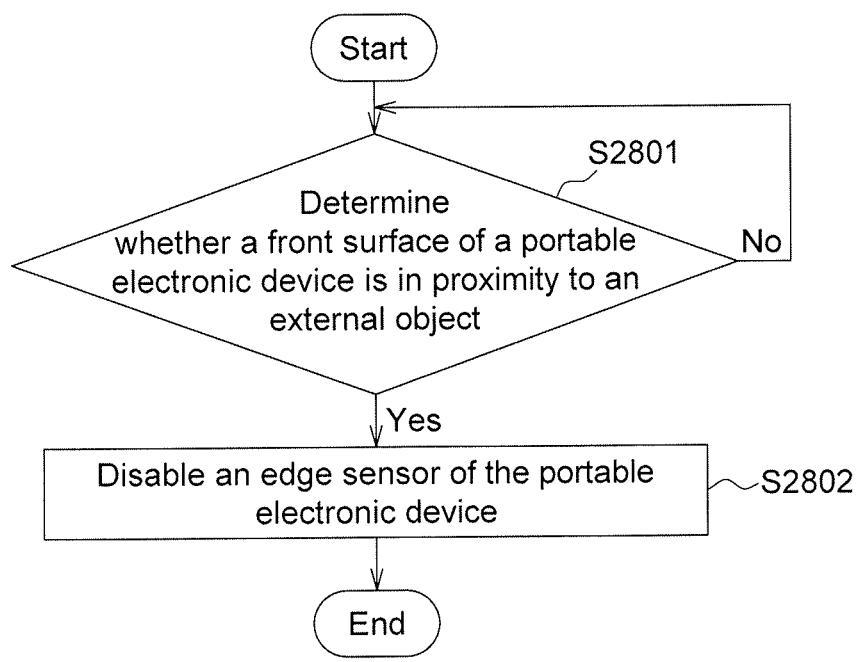
FIG. 28 shows a flowchart of an operating method for a portable electronic device.

In an embodiment, an operating method for a portable electronic device is provided. Referring to FIG. 28, a flowchart of an operating method for a portable electronic device is shown. The operating method is described with the following steps. In step S2801: it is determined that whether a front surface of a portable electronic device is in proximity to an external object. If yes, step S2802 is performed. In step S2802, an edge sensor of the portable electronic device is disabled.

Figure 31:
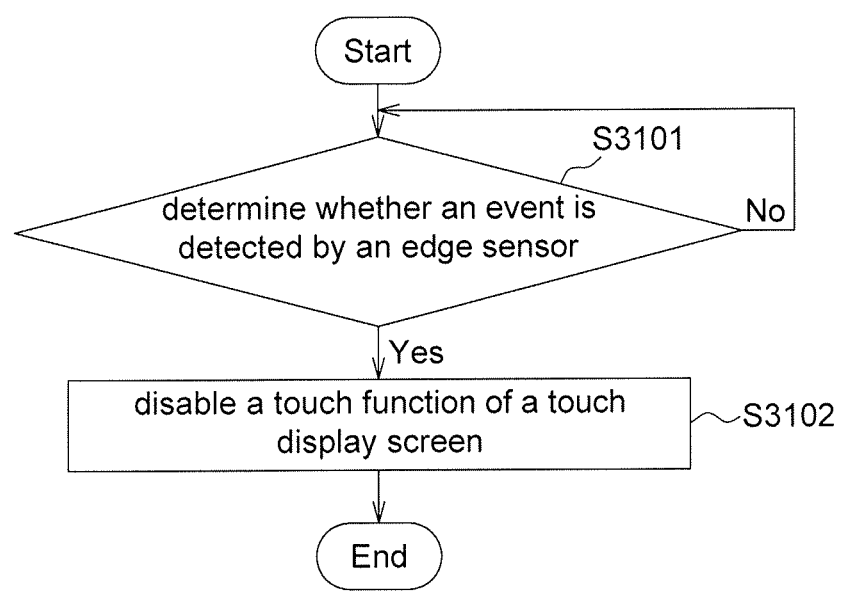
FIG. 31 shows a flowchart of an operating method for a portable electronic device.

In an embodiment, an operating method for a portable electronic device is provided. Referring to FIG. 31, a flowchart of an operating method for a portable electronic device is shown. The portable electronic device comprises a body, a touch display screen and an edge sensor. The touch display screen is disposed on the body. The edge sensor is disposed adjacent to an edge of the body. The operating method is described with the following steps. In step S3101, it is determined that whether an event is detected by the edge sensor. If yes, step S3102 is performed. In step S3102, a touch function of the touch display screen is disabled.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operating method for a portable electronic device, the portable electronic device comprising a body, a touch display screen disposed on the body, and an edge sensor disposed adjacent to an edge of the body, the operating method comprising:

sensing a pressing force by the edge sensor;

determining whether the pressing force sensed by the edge sensor increases and reaches to a squeezing threshold and displaying a visual image for indicating that a squeezing action is performed;

in response to determining that the pressing force sensed by the edge sensor increases and reaches to the squeezing threshold, determining an effective squeezing action begins at a first time point and whether the pressing force sensed by the edge sensor decreases and reaches to a releasing threshold, wherein the releasing threshold is smaller than the squeezing threshold;

in response to determining the pressing force sensed by the edge sensor decreases and reaches to the releasing threshold, determining the effective squeezing action finishes at a second time point, wherein the pressing force of the effective squeezing action sensed by the edge sensor between the first time point and the second time point is continuously larger than the releasing threshold; and performing a predetermined function according to a time period between the first time point and the second time point, wherein the predetermined function is different from displaying the visual image for indicating that the squeezing action is performed.

2. The operating method for the portable electronic device according to claim 1, further comprising showing a panel on the touch display screen base on a second action performed on the edge sensor along a direction towards the touch display screen which is detected by the portable electronic device.

3. The operating method for the portable electronic device according to claim 2, wherein the step of showing the panel on the touch display screen base on the second action performed on the edge sensor along the direction towards the touch display screen which comprises determining the direction of the second action towards the touch display screen by detecting a sensing signal generated from the edge sensor and a touch signal generated from the touch display screen.

4. The operating method for the portable electronic device according to claim 1, wherein displaying the visual image for indicating that the squeezing action is performed comprising:
displaying the visual image on the touch display screen according to the pressing force sensed by the edge sensor; and
changing the visual image according to an amount of the pressing force sensed by the edge sensor.

5. The operating method for the portable electronic device according to claim 1, further comprising: determining a display position of a keyboard image on the touch display screen according to a gesture for holding the portable electronic device sensed by the edge sensor.

6. The operating method for the portable electronic device according to claim 1, further comprising: capturing a content displayed on the touch display screen according to a slide action performed on both long sides of the portable electronic device which is detected by the portable electronic device.

7. A non-transitory computer readable recording medium for storing one or more programs, the one or more programs causing a processor to perform the method according to claim 1 after the one or more programs are loaded on a computer and are executed.

8. A portable electronic device, comprising:
a body;
a processor;
a touch display screen disposed on the body; and
an edge sensor electrically coupled to the processor and disposed adjacent to an edge of the body,
wherein the edge sensor senses a pressing force by the edge sensor, the processor determines whether the pressing force sensed by the edge sensor increases and reaches to a squeezing threshold, and the touch display screen displays a visual image for indicating that a squeezing action is performed,
wherein the processor determines an effective squeezing action begins at a first time point and whether the pressing force sensed by the edge sensor decreases and reaches to a releasing threshold in response to determining that the pressing force sensed by the edge sensor increases and reaches to the squeezing threshold, and the releasing threshold is smaller than the squeezing threshold,
wherein the processor determines the effective squeezing action finishes at a second time point in response to determining that the pressing force sensed by the edge sensor decreases and reaches to the releasing threshold, and wherein the pressing force of the effective squeezing action sensed by the edge sensor between the first time point and the second time point is continuously larger than the releasing threshold, and
wherein the processor performs a predetermined function according to a time period between the first time point and the second time point, and the predetermined function is different from the displaying the visual image for indicating that the squeezing action is performed.

9. The portable electronic device according to claim 8, wherein the touch display screen is controlled to show a panel by the processor according to a second action performed on the edge sensor along a direction towards the touch display screen.

10. The portable electronic device according to claim 8, wherein the touch display screen is controlled to display the visual image by the processor according to the pressing force sensed by the edge sensor, and the visual image changes according to an amount of the pressing sensed by the edge sensor.

11. The portable electronic device according to claim 8, wherein a display position of a keyboard image on the touch display screen is determined by the processor according to a gesture for holding the portable electronic device sensed by the edge sensor.

12. The portable electronic device according to claim 8, wherein a content displayed on the touch display screen is captured by the portable electronic device according to a slide action performed on both long sides of the portable electronic device.

13. The operating method for the portable electronic device according to claim 1, further comprising:
disabling a touch function of a region of the touch display screen or the whole touch display screen according to the effective squeezing action sensed by the edge sensor.

14. The portable electronic device according to claim 8, wherein according to the effective squeezing action sensed by the edge sensor, a touch function of a region of the touch display screen or the whole touch display screen is disabled.

15. The operating method for the portable electronic device according to claim 1, further comprising:
determining a current status of the portable electronic device, wherein the current status is a status of the portable electronic device currently being performed.

16. The portable electronic device according to claim 8, wherein a current status of the portable electronic device is determined, and the current status is a status of the portable electronic device currently being performed.

17. The operating method for the portable electronic device according to claim 1, further comprising:
determining the effective squeezing action corresponds to a long squeezing event or a short squeezing event according to the time period, wherein the predetermined function comprises a first predetermined function and a second predetermined function, the first predetermined function is performed in response to the effective squeezing action corresponding to the long squeezing event, the second predetermined function is performed in response to the effective squeezing action corresponding to the short squeezing event, and the first predetermined function and the second predetermined function are different.

18. The portable electronic device according to claim 8, wherein the squeezing action corresponds to a long squeezing event or a short squeezing event is determined according to the time period, the predetermined function comprises a first predetermined function and a second predetermined function, the first predetermined function is performed according to the effective squeezing action corresponding to the long squeezing event, the second predetermined function is performed according to the squeezing action corresponding to the short squeezing event, and the first predetermined function and the second predetermined function are different.

19. The operating method for the portable electronic device according to claim 17, wherein the long squeezing event and the short squeezing event are determined by comparing the time period to a time threshold.

20. The portable electronic device according to claim 18, wherein the long squeezing event and the short squeezing event are determined by comparing the time period to a time threshold.

* * * * *